(12) United States Patent
Vargantwar et al.

(10) Patent No.: US 8,160,634 B1
(45) Date of Patent: Apr. 17, 2012

(54) INTELLIGENT POWER CONTROL IN A WIRELESS NETWORK

(75) Inventors: Sachin R. Vargantwar, Overland Park, KS (US); Debasish Sarkar, Irvine, CA (US); Siddharth S. Oroskar, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 261 days.

(21) Appl. No.: 12/605,457

(22) Filed: Oct. 26, 2009

Related U.S. Application Data

(63) Continuation-in-part of application No. 12/405,344, filed on Mar. 17, 2009, now Pat. No. 8,060,128.

(51) Int. Cl.
*H04B 7/005* (2006.01)
*H04B 15/00* (2006.01)

(52) U.S. Cl. ..... 455/522; 455/69; 455/127.1; 455/67.11

(58) Field of Classification Search ............ 455/69, 455/522, 67.11, 126, 127.1, 127.2, 127.5, 455/115.1, 574; 370/235, 236, 328, 331, 370/470
See application file for complete search history.

(56) References Cited

U.S. PATENT DOCUMENTS

| | | | | |
|---|---|---|---|---|
| 6,532,357 | B1 * | 3/2003 | Ichikawa | 455/126 |
| 6,697,634 | B1 * | 2/2004 | Hayashi | 455/522 |
| 6,792,248 | B1 * | 9/2004 | Naghian | 455/69 |
| 7,336,929 | B2 | 2/2008 | Yasuda et al. | |
| 2006/0003700 | A1 | 1/2006 | Yasuda et al. | |
| 2007/0026812 | A1 | 2/2007 | Hu et al. | |
| 2011/0142150 | A1 * | 6/2011 | Anigstein et al. | 375/260 |

OTHER PUBLICATIONS

Notice of Allowance in U.S. Appl. No. 12/405,344 mailed Jun. 24, 2011.

* cited by examiner

*Primary Examiner* — John J Lee

(57) ABSTRACT

A method and system is disclosed for intelligent power control in a wireless communication system. In accordance with an example embodiment, a first device will operate in a dynamic-power state in which it transmits a power-increment command or power-decrement command in response to each of periodic comparisons of a signal power level of a signal received from a second device with a threshold power level. While operating in the dynamic-power state, the first device will recognize when it has transmitted a threshold number of alternating power-increment and power-decrement commands, and responsively will transition to operating in a steady-power state in which it continues to transmit alternating power-increment and power-decrement commands even if it detects that the second device has ceased responding to the alternating power-increment and power-decrement commands. While operating in the steady-power state, the first device will recognize when the difference between a currently-received signal power level and the threshold power level is greater than a differential threshold power, and based at least on the recognition will transition to operating in the dynamic power state.

30 Claims, 12 Drawing Sheets

INTELLIGENT POWER CONTROL IN A WIRELESS NETWORK

CROSS-REFERENCE TO RELATED APPLICATIONS

This application claims priority from and is a continuation-in-part of U.S. patent application Ser. No. 12/405,344, which was filed on Mar. 17, 2009, and which is hereby incorporated herein in its entirety by reference.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Hence, on the forward link, the base station transmits and the access terminal receives, while on the reverse link, the access terminal transmits and the base station receives. Under CDMA and related protocols, the transmission power of a "sending entity" (base station on the forward link, access terminal on the reverse link) is adjusted according to an adaptive power-control protocol that uses to a form of feedback from a "receiving entity" (access terminal on the forward link, base station on the reverse link). Specifically, the receiving entity monitors an error rate of data received from a particular sending entity in order to dynamically set a threshold level of received power from the particular sending entity that needs to be achieved in order to maintain the error rate at some preset, acceptable level. As operating conditions change, the receiving entity may adjust the threshold level accordingly. The receiving entity also continually compares the actual received power from the particular sending entity with the threshold level, and then sends power-control commands to the particular sending entity that instruct the particular sending entity to adjust its transmission power level so as to achieve the threshold level, as measured at the receiving entity. The error-rate monitoring and dynamic setting of the threshold level are carried out on a time scale that is long compared with than that used for sending the power-control commands. Thus, the dynamic setting of the threshold is aimed at responding to relatively gradual changes in received-power requirements, while the power-control commands are aimed at relatively rapid achievement of received-power requirements once they have been determined according to the threshold level.

Each power-control command is typically either a "power-increment" command, instructing the sending entity to increase its transmission power by small amount, or a "power-decrement" command, instructing the sending entity to decrease its transmission power by small amount. In practice, the receiving entity sends a continuous stream or sequence of periodic power-control commands to the sending entity. The process of achieving the received-power threshold at the receiving entity can be thought of conceptually as a sort of "coarse" adjustment that brings the actual received power to near-convergence with the threshold level, followed by continuous "fine" adjustments aimed at keeping the actual received power very close to the threshold level (until another coarse adjustment becomes necessary). The coarse adjustment compensates for roughly discontinuous shifts between the actual received power and the threshold level (e.g., when the threshold level is adjusted, or operating conditions suddenly change), and typically entails the sending entity responding to a sequence of consecutive power-increment commands or consecutive power-decrement commands from the receiving entity. The fine adjustments generally comprise a sequence of alternating power-increment and power-decrement commands that cause the actual received power to fluctuate slightly above and below the threshold as the sending entity sequentially responds to each command.

It may occur that the threshold level determined by a receiving entity for a particular sending entity remains stable (unchanged) for a relatively long interval of time, resulting in a long interval of fine adjustments. When this happens, the particular sending entity will cycle through a correspondingly large number of alternating power increments and power decrements of its transmission power in response to alternating power-increment and power-decrement commands sent from the receiving entity as the receiving entity detects received power alternatingly below and above the threshold. The alternating power increments and power decrements of the sending entity's transmission power over the course of time when the threshold level is stable can be an inefficient use of the sending entity's transmission power. When the sending entity is an access terminal, the inefficiency could also have a negative impact on performance and/or battery life.

U.S. patent application Ser. No. 12/405,344 (incorporated by reference as noted above) discloses example embodiments of a method and system for intelligent power control in which the sending entity advantageously can recognize when it is operating under conditions of a stable threshold (as seen by the receiving entity) and can responsively cease responding to power-control commands until responding to power-control commands is once again appropriate or necessary. It would be further advantageous for the receiving entity to similarly recognize when a sending entity is operating under conditions of a stable threshold (as seen by the receiving entity), and responsively expect the sending entity to cease responding to power-control commands until responding to power-control commands is once again appropriate or necessary.

Hence in one respect, various embodiments of the present invention provide, in a first device communicatively coupled with a second device via an air interface, a method comprising: the first device operating in a dynamic-power state in which the first device at least: (i) periodically compares a signal power level of a signal received from the second device with a threshold power level, (ii) transmits a power-increment command to the second device responsive to each comparison that indicates the signal power level is below the threshold power level, and (iii) transmits a power-decrement command to the second device responsive to each comparison that indicates the signal power level is above the threshold power level; while operating in the dynamic-power state, making a first determination that the first device has transmitted a sequence of a threshold number of alternating power-increment and power-decrement commands to the second device; responsive to the first determination, transitioning to operating in a steady-power state in which the first device at least: (i) continues to transmit a further sequence of alternating power-increment and power-decrement commands to the second device even if the received signal power level remains above the threshold power level during transmission of the further sequence, and (ii) continues to transmit the further sequence of alternating power-increment and power-decrement commands to the second device even if the received signal power level remains below the threshold power level during transmission of the further sequence; while operating in the steady-power state, making a second determination that a difference between a currently-received signal power level and the threshold power level is greater than a differential threshold power; and based at least on the second determination, transitioning from operating in the steady-power state to operating in the dynamic-power state.

In another respect, various embodiments of the present invention provide, in a first device configured to communicate with a second device via an air interface, the first device comprising: means for operating in a dynamic-power state in which the first device at least: (i) periodically compares a signal power level of a signal received from the second device with a threshold power level, (ii) transmits a power-increment command to the second device responsive to each comparison that indicates the signal power level is below the threshold power level, and (iii) transmits a power-decrement command to the second device responsive to each comparison that indicates the signal power level is above the threshold power level; means for making a first determination that the first device has transmitted a sequence of a threshold number of alternating power-increment and power-decrement commands to the second device while operating in the dynamic-power state; means for responding to the first determination by transitioning to operating in a steady-power state in which the first device at least: (i) continues to transmit a further sequence of alternating power-increment and power-decrement commands to the second device even if the received signal power level remains above the threshold power level during transmission of the further sequence, and (ii) continues to transmit the further sequence of alternating power-increment and power-decrement commands to the second device even if the received signal power level remains below the threshold power level during transmission of the further sequence; means for, while operating in the steady-power state, making a second determination that a difference measured between a currently-received signal power level and the threshold power level is greater than the differential threshold power; and means for transitioning from operating in the steady-power state to operating in the dynamic-power state, based at least on the second determination.

In yet another respect, various embodiments of the present invention provide, in a tangible computer-readable medium having stored thereon computer-executable instructions that, if executed by a first device, cause the first device to perform functions comprising: operating in a dynamic-power state in which the first device at least: (i) periodically compares a signal power level of a signal received from a second device with a threshold power level, wherein the signal is received on an air interface that is configured to communicatively couple the first device and the second device, (ii) transmits a power-increment command to the second device responsive to each comparison that indicates the signal power level is below the threshold power level, and (iii) transmits a power-decrement command to the second device responsive to each comparison that indicates the signal power level is above the threshold power level; while operating in the dynamic-power state, making a first determination that the first device has transmitted a sequence of a threshold number of alternating power-increment and power-decrement commands to the second device; responsive to the first determination, transitioning to operating in a steady-power state in which the first device at least: (i) continues to transmit a further sequence of alternating power-increment and power-decrement commands to the second device even if the received signal power level remains above the threshold power level during transmission of the further sequence, and (ii) continues to transmit the further sequence of alternating power-increment and power-decrement commands to the second device even if the received signal power level remains below the threshold power level during transmission of the further sequence; while operating in the steady-power state, making a second determination that a difference measured between a currently-received signal power level and the threshold power level is greater than the differential threshold power; and based at least on the second determination, transitioning from operating in the steady-power state to operating in the dynamic-power state.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. It should be understood that the present invention can apply to other wireless voice and data protocols including, without limitation, IS-95 and GSM, which, together with IS-856 and IS-2000 are considered herein, individually or in combination, to comprise a CDMA family of protocols.

Figure 1:
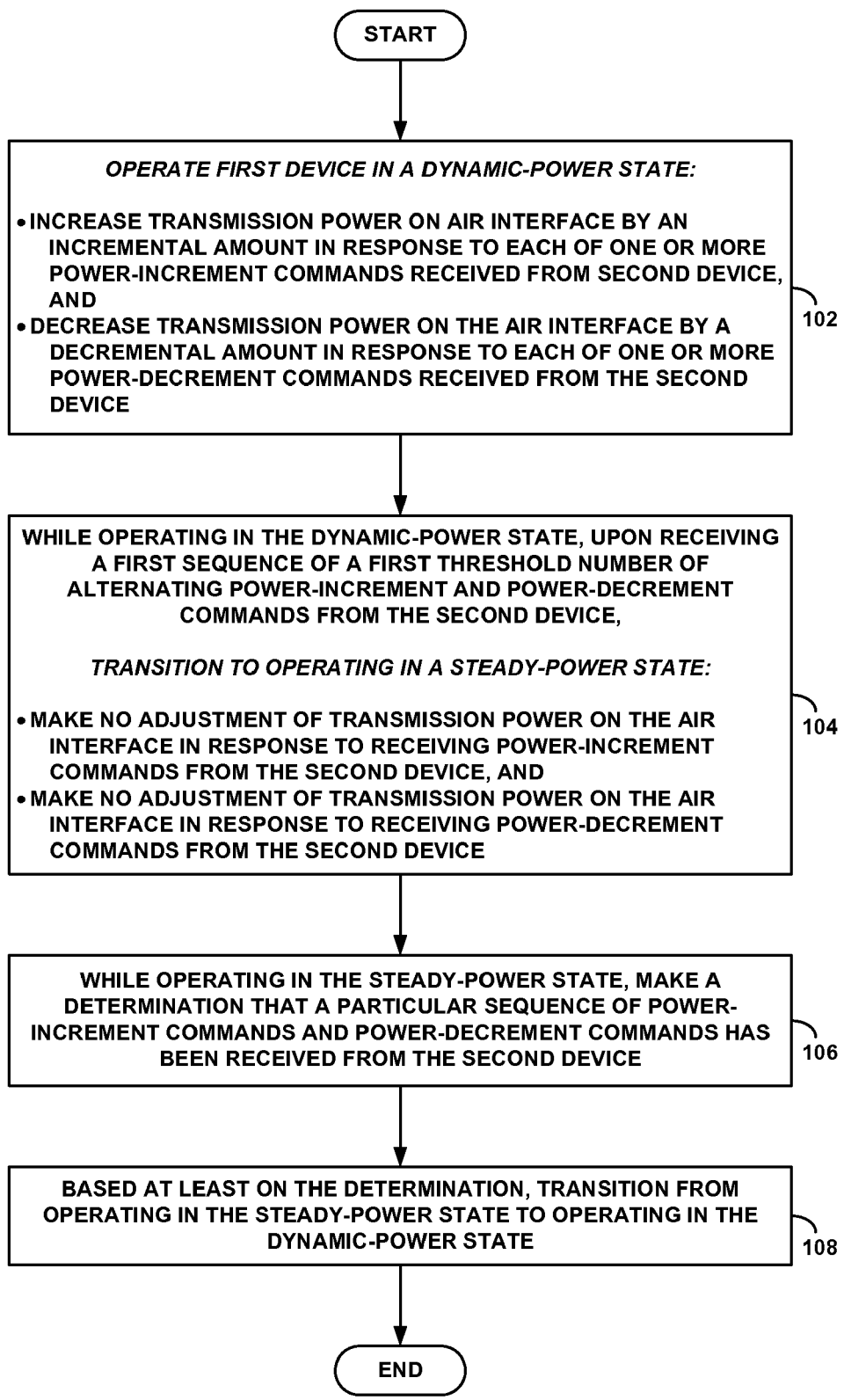
FIG. 1 is a flowchart illustrating an example embodiment of intelligent power control.

FIG. 1 is a flowchart illustrating an example embodiment of intelligent power control. The context for the example embodiment is a first device communicatively coupled with a second device via an air interface, wherein the steps of the flowchart are implemented in the first device. By way of example, the first and second devices could be in and/or be part of a wireless communication system that operates according to a CDMA family of protocols, and the air interface could be an RF interface. More particularly, the first device is taken to be a sending entity defined in accordance with the brief description above, and the second device is taken to be a receiving entity also defined in accordance with the description above. Thus, in one configuration, the first device could be an access terminal and the second device a base station, and in another configuration, the first device could be a base station and the second device an access terminal. FIG. 1 applies to either or both configurations, and the example embodiment should be considered as encompassing an implementation of the steps of FIG. 1 in at least either or both an access terminal and a base station.

In the discussion of FIG. 1, as well as in other discussions and explanations herein, the terms "first" and "second" as applied to "devices," "sequences," "thresholds," and "threshold numbers" are used as identifying labels, and not meant to imply any numerical ordering (although a numerical ordering is not necessarily excluded). Additionally, reference herein to sequences of power-control commands should be understood to define groupings of temporally sequenced power-control commands. For example, "receiving a sequence of power-control commands" should be taken to mean receiving the power-control commands of the sequence one command after the other in time.

At step 102, the first device operates in a "dynamic-power state," in which the first device responds to power-control commands from the second device in accordance with the CDMA power-control protocols described above. Specifically, for each of one or more power-increment commands received at the first device from the second device, the first device increases the transmission power on its air interface by an incremental amount. Similarly, for each of one or more power-decrement commands received at the first device from the second device, the first device decreases the transmission power on its air interface by a decremental amount. In accordance with CDMA power-control protocols, and as described in more detail below, power-control commands are sent by the receiving entity (second device in the example embodiment) at rate of 800 per second (although other rates could be used), each power-increment command is a "power-up" command, and each power-decrement command is a "power-down" command. Further, the incremental and decremental amounts of transmission power could be specified as absolute amounts of power, but are typically specified as fractions of a current transmission power level on the air interface, wherein the "current transmission power level" is the transmission power level at the time that the increase or decrease is applied.

In practice, the transmission power level on the air interface is specified as a gain level, x, according to the relation x dBm=$10 \log_{10}(P/1 \text{ mW})$, where P is the power in mW (milliwatts), and each incremental amount or decremental amount is specified to be 1 dB with respect to the current level (although other quantities of dBs could be used). As such, while operating in the dynamic-power state, the first device increases transmission power on its air interface by 1 dB for each power-up command that it receives, and decreases its transmission power by 1 dB for each power-down command that it receives. Note that a 3 dB change (up or down) corresponds to a factor of two in absolute power (increase or decrease).

At step 104, while the first device is still operating in the dynamic-power state, upon receiving a first threshold number of alternating power-increment and power-decrement commands, the first device transitions to a "steady-power state." In the steady power state, the first device makes no adjustments to the transmission power on its air interface in response to receiving any power-control commands (power-ups or power-downs). Since alternating power-increment and power-decrement commands generally indicate that a sending entity is transmitting on its air interface at a roughly constant power level that achieves the received-power threshold at a receiving entity, the number of alternating commands received provides an indication of how long the threshold power level has been achieved. Hence, the first threshold number of alternating commands corresponds to a threshold duration of time of stable power operation of the first device with respect to the threshold power level.

By determining that it has received the first threshold number of alternating power-increment and power-decrement commands, the first device (sending entity) advantageously can recognize that it is transmitting at a stable power level with respect to the threshold power level at the second device (receiving entity). By transitioning to the steady-power state upon this recognition, the first device can advantageously avoid any inefficiencies (or other negative impacts) of alternatingly increasing and decreasing transmission power on its air interface.

In accordance with the example embodiment, in addition to adjusting transmission power on its air interface in response to each received power-control command (while in the dynamic-power state), the first device can keep track of the received power-control commands in order to determine if and when it has received the first threshold number of alternating power-increment and power-decrement commands. For instance, the first device may accumulate a count of alternating power-increment and power-decrement commands in some form of memory (such as internal "random-access memory" or magnetic disk). Note that the first threshold number could correspond to a number of pairs of alternating power-increment and power-decrement commands, or instead to a total number of power-control commands in a sequence comprised of strictly alternating power-increment and power-decrement commands. Additionally, the first threshold number of alternating power-increment and power-decrement commands could correspond to a sequence of power-control commands that begins with either a power-increment command or a power-decrement command, and similarly ends with either a power-increment command or a power-decrement command.

In a wireless communication system that operates according to a CDMA family of protocols, data on either the forward or reverse links may be transmitted in regular units called "frames" (this is explained in more detail below). Each frame typically corresponds to 20 milliseconds (ms) duration. Since, as noted above, power-control commands are sent at a rate of 800 per second, 16 power-control commands can be sent over the duration of one frame interval. In further accordance with the example embodiment, the first threshold number corresponds to a non-zero, positive integer number of CDMA frames. For instance, the first threshold number could correspond to two frames, although other numbers of frames could be used. The reason for specifying the first threshold number in terms of frames is that, as explained below, the error rate used to determine the threshold power level at the receiving entity is typically measured over intervals of integer numbers of frames.

At step 106, while operating in the steady-power state, the first device continues to keep track of the sequences of power-control commands that it receives from the second device, and makes a determination as to if and when a particular sequence of power-increment and power-decrement commands is received. For example, since the first device does not respond to power-control commands while in the steady-power stated, the second device may try to compensate by sending consecutive power-increment commands or consecutive power-decrement commands. Hence, in accordance with the example embodiment, making the determination that the particular sequence of power-increment and power-decrement commands has been received could comprise making a determination that either a second threshold number of consecutive power-increment commands or a third threshold number of consecutive power-decrement commands has been received.

Alternatively, making the determination that the particular sequence of power-increment and power-decrement commands has been received could comprise making a determination that both a second threshold number of power-increment commands and a third threshold number of power-decrement commands has been received. As a further aspect of this alternative form of making the determination, the first device could compute the net adjustment in transmission power on its air interface that would result from responding to all of both the second threshold number of power-increment commands and a third threshold number of power-decrement commands. The first device could then determine if the net adjustment would place the transmission power outside of a range about the current transmission power level. For instance, the range could be defined by a first threshold power level above the current transmission power level and a second threshold power level below the current transmission power level. If the net adjustment does exceed the range, the first device could then infer that the particular sequence of power-increment and power-decrement commands had been received.

Finally, at step 108, based at least on the determination made at step 106, the first device transitions from operating in the steady-power state to operating in the dynamic-power state. In accordance with the example embodiment, the determination made at step 106 is used by the first device (sending entity) as an indication that the transmission power of its air interface is not satisfying the threshold level at the second device (receiving entity). Thus, by making the determination at step 106, the first device advantageously can recognize that it is no longer transmitting at a stable power level with respect to the threshold power level at the second device. By transitioning to the dynamic-power state based at least upon this recognition, the first device can advantageously once again respond to power-control commands so as to adjust the transmission power on its air interface to achieve the threshold level at the second device.

Basing the transition of the first device from the steady-power state to the dynamic-power state at least on the determination made at step 106 should be understood to mean that the determination is a necessary condition, but not necessarily a sufficient condition for the transition. In particular, while the determination made at step 106 indicates an operating condition in which the first device is not transmitting at a power level that satisfies the threshold level at the second device, that operating condition might be temporary or transient, such that the first device could return to stable power operation by responding to just one or a few power-control commands from the second device. In this case, it would be advantageous for the first device to briefly exit from the steady-power state, make a small adjustment to its transmission power, and then return to the steady-power state without ever entering the dynamic-power state. This would allow the first device to avoid having to respond again to the first threshold number of alternating power-increment and power-decrement commands before transition to the steady-power state.

In accordance with the example embodiment, the possibility that the divergence of the actual received power at the second device from the threshold level is transient or temporary can be accommodated by introducing a third operational state, namely a "quasi-dynamic-power state" (not explicitly described in FIG. 1). Thus, when the first device is operating in the steady-power state and makes the determination of step 106, the first device will respond to at least one of the power-control commands of the particular sequence (i.e., the sequence that resulted in the determination being made), and then transition to the quasi-dynamic-power state. In the quasi-dynamic-power state, the first device will determine, based on power-control commands received while in the quasi-dynamic-power state, if it should transition to the dynamic-power state or back to the steady-power state. If the divergence is transient, then the first device will transition back to the steady-power state; if not, then the first device will transition to the dynamic-power state. Since the determination of step 106 takes the first device to the quasi-dynamic-power state from which the first device might transition to the dynamic-power state, the determination of step 106 represents a necessary, but not necessarily sufficient, condition for transition of the first device from the steady-power state to the dynamic power state.

It will be appreciated that the steps of FIG. 1 are exemplary, and that additional and/or alternative steps or alternative ordering of steps could be carried out and still remain within the scope and spirit of the present invention.

Figure 2:
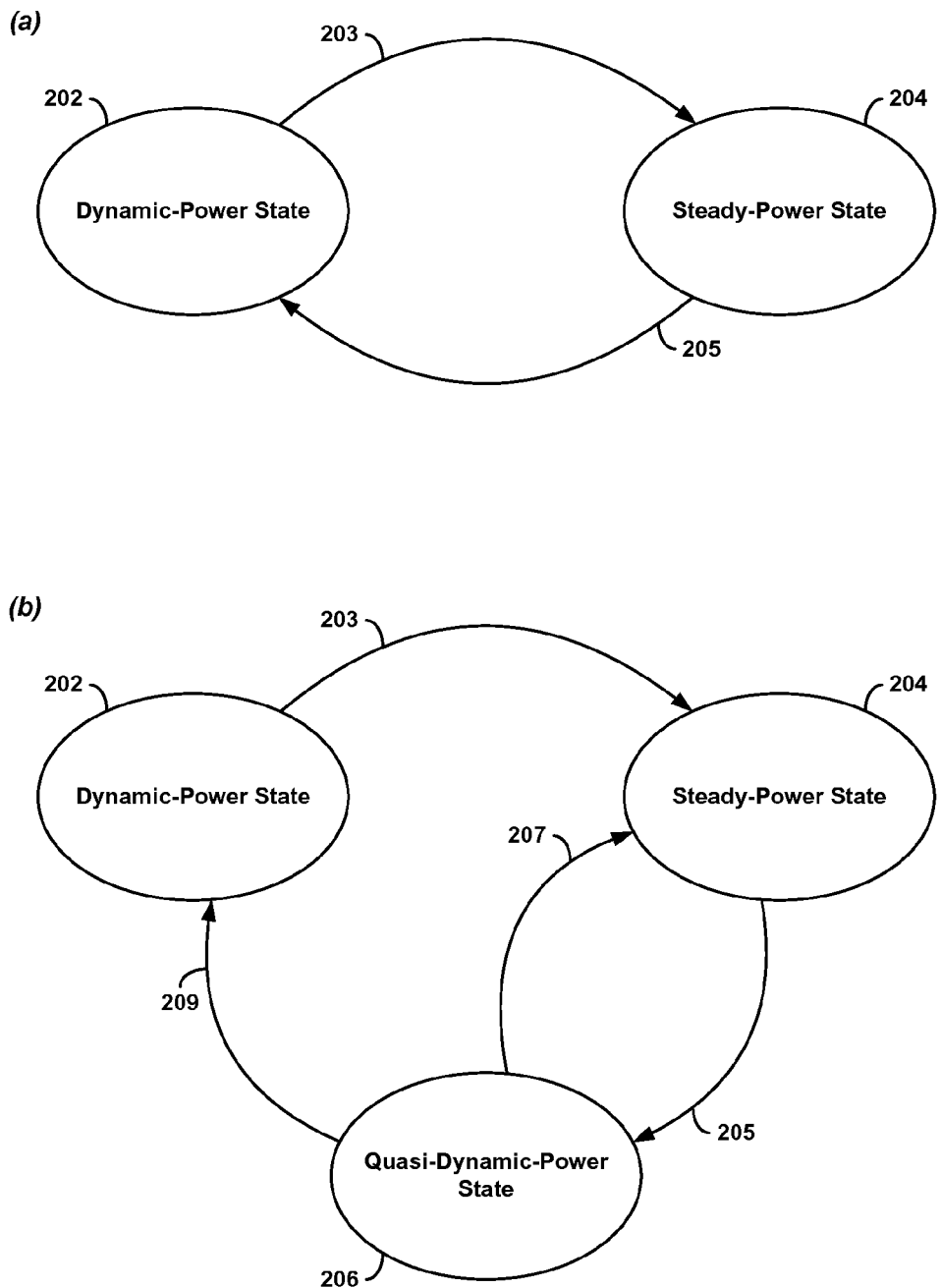
FIG. 2 illustrates example operation of intelligent power control in the form of state diagrams.

FIG. 2 illustrates the arrangement of states and transitions associated with the example embodiment of FIG. 1. The top panel (labeled "(a)") of FIG. 2 shows dynamic-power state 202 and steady-power state 204, with transition 203 from state 202 to state 204 and transition 205 from state 204 to state 202. Transition 202 corresponds to the receipt by the first device of the first threshold number of alternating power-increment and power-decrement commands. Transition 205 corresponds to (i) the determination at step 106 that the particular sequence of power-increment and power-decrement commands has been received, and (ii) any other conditions required for the transition from state 204 to state 202.

The bottom panel (labeled "(b)") of Figure illustrates the three-state description of the example embodiment. Specifically, panel (b) shows dynamic-power state 202, steady-power state 204, and quasi-dynamic-power state 206, with transition 203 from state 202 to state 204, transition 205 from state 204 to state 206, transition 207 from state 206 to state 204, and transition 209 from state 206 to state 202. As with panel (a), transition 202 corresponds to the receipt by the first device of the first threshold number of alternating power-increment and power-decrement commands. Transition 205 corresponds only to the determination at step 106 that the particular sequence of power-increment and power-decrement commands has been received. Transition 207 corresponds to a determination that the divergence of the actual received power at the second device from the threshold level was transient or temporary. Transition 209 corresponds to a determination that the divergence of the actual received power at the second device from the threshold level was not transient or temporary. Note that some of the transitions in both panels (a) and (b) may be accompanied by the first device responding to one or more power-control commands received while the first device was in a state that preceded the transition. Further details of the various state transitions are discussed below.

Figure 3:
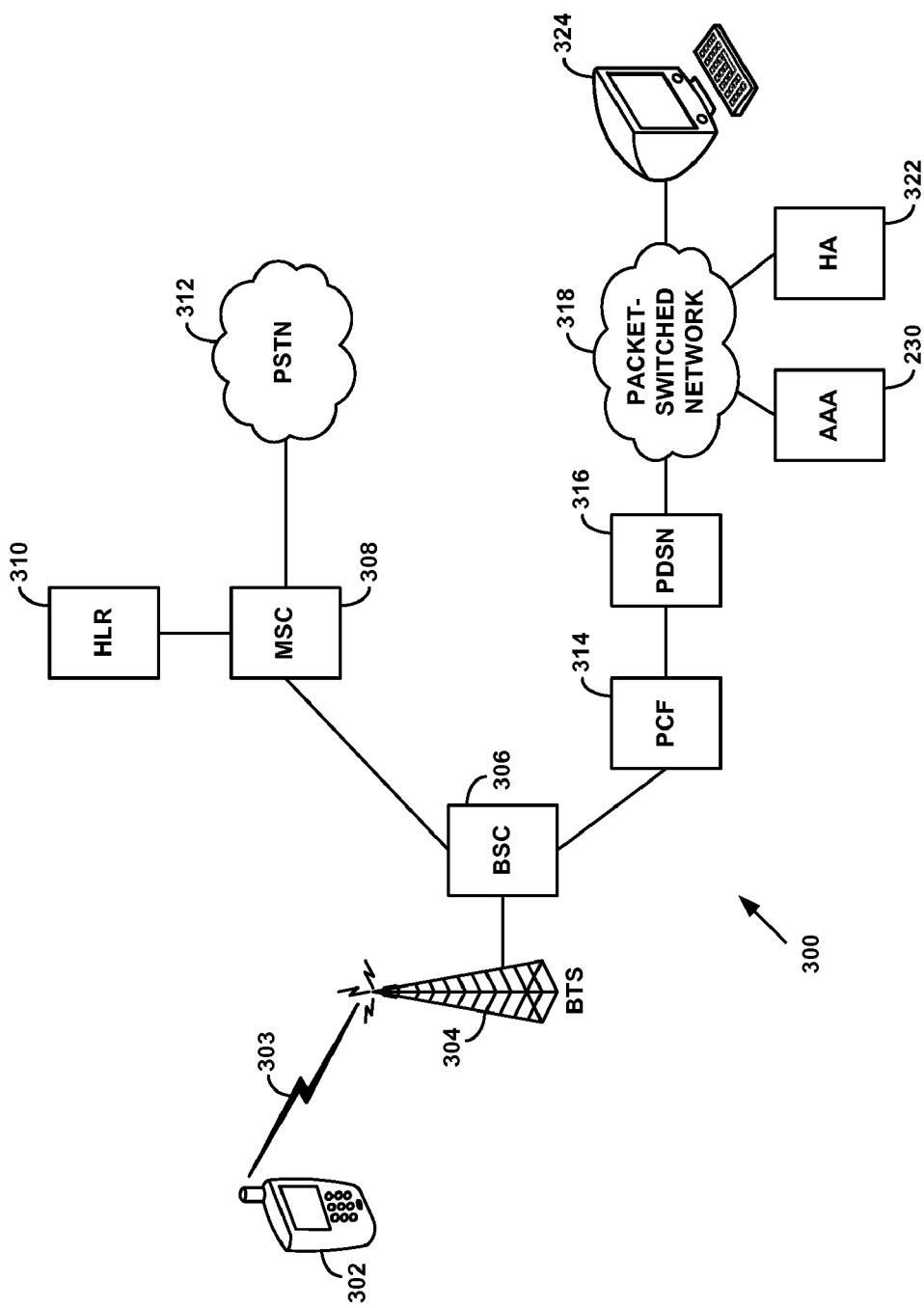
FIG. 3 is a simplified block diagram of a wireless communication system in which example embodiments of intelligent power control and an enhancement of intelligent power control can be employed.

FIG. 3 shows a simplified block diagram of a wireless communication system 300 in which an example embodiment of intelligent power control can be employed. Access terminal AT 302 communicates over an air interface 303 with a BTS 304, which is then coupled or integrated with a BSC 306. Transmissions over air interface 303 from BTS 304 to AT 302 represent the forward link to the access terminal (also referred to herein alternatively as the forward link from the base station, and as "the AT's forward link"). Transmissions over interface 303 from AT 302 to BTS 304 represent the "reverse link" (also referred to herein as "the AT's reverse link"). It will be appreciated that the arrangement shown in the figure is illustrative.

BSC 306 is connected to MSC 308, which acts to control assignment of air traffic channels (e.g., over air interface 303), and provides access to wireless circuit-switched services such as circuit-voice and circuit-data (e.g., modem-based packet data) service. As represented by its connection to PSTN 312, MSC 308 is also coupled with one or more other MSCs or other telephony circuit switches in the operator's (or in a different operator's) network, thereby supporting user mobility across MSC regions, and local and long-distance landline telephone services. Also connected to MSC 308 is home location register (HLR) 310, which supports mobility-related aspects of subscriber services, including dynamic tracking of subscriber registration location and verification of service privileges.

As shown, BSC 306 is also connected with a PDSN 316 by way of packet control function (PCF) 314. PDSN 316 in turn provides connectivity with a packet-switched network 318, such as the Internet and/or a wireless carrier's private core packet-network. Sitting as nodes on network 318 are, by way of example, an authentication, authorization, and accounting (AAA) server 320, a mobile-IP home agent (HA) 322, and a remote computer 324. After acquiring an air traffic channel over its air interface, an access terminal (e.g., AT 302) may send a request to PDSN 316 for a connection in the packet data network. Then, following authentication of the access terminal by AAA server 320, the access terminal may be assigned an IP address by the PDSN or by HA 322, and may thereafter engage in packet-data communications with entities such as remote computer 324.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 302 typically comprises a user-interface, I/O components, a transceiver, a communication interface, a tone detector, a processing unit, and data storage, all of which may be coupled together by a system bus or other mechanism. As such, system 300, AT 302, and air interface 303 are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

Data sent on both the forward and reverse links are first assembled into units called frames, which are then encoded for transmission to or from the access terminal at regular intervals (corresponding to a frame rate), typically 20 milliseconds in duration (although other frame intervals can be used). As a result of imperfect transmission, some frames received by the AT on the forward link or by the base station on the reverse link may contain errors. Other frames—ideally, the majority of them—will be received without errors. It may also be possible through one or another coding technique to correct certain errors in frames.

On either link, the receiving entity (e.g., AT or base station) can compute a ratio of (i) the number of error-containing frames received during a given period of time to (ii) the total number of frames received during the same period of time. This ratio, computed by the AT on the forward link and by the base station on the reverse link, is called the frame error rate (FER). The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa. For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. Since the protocols are similar for both the forward and reverse links, it sufficient for the present purposes to describe the details of power control with reference only the reverse link. However, it should be understood that, except for switching operational roles of an access terminal and a base station (i.e., roles with respect to sending and responding to power-control commands described below), the basic principles apply to the forward link as well.

More specifically, for inner-loop power control, the base station measures (for each reverse link) SNR at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the base station compares $E_b/N_0$ with a threshold value called $(E_b/N_0)_{setpoint}$ and responsively sets and sends a power control bit to the AT in order to affect a power adjustment. In practice, power adjustment is applied in terms of gain relative to a current power level, and measured in dB. For $E_b/N_0 \leq (E_b/N_0)_{setpoint}$, the base station sets the power control bit to "power up," and, in conventional operation, the AT responsively increases the reverse link gain by a small amount (typically 1 dB or less). For $E_b/N_0 > (E_b/N_0)_{setpoint}$, the base station sets the power control bit to "power down," and, in conventional operation, the AT responsively decreases the reverse link gain by the same small amount. In this manner, the reverse link power rapidly converges, in small increments or decrements, to a level where $E_b/N_0 \approx (E_b/N_0)_{setpoint}$, and thereafter fluctuates about $(E_b/N_0)_{setpoint}$ until $(E_b/N_0)_{setpoint}$ is adjusted to a new value by outer-loop power control, or operating conditions change such that $E_b/N_0$ diverges from $(E_b/N_0)_{setpoint}$. Each transmission by the base station of the power control bit set to power up is commonly referred to as a "power-up command." Similarly, each transmission of the power control bit set to power down is referred to as a "power-down command." Power-up commands are specific examples of the more generically-termed power-increment commands described above, and power-down commands are specific examples of the more generically-termed power-decrement commands described above.

For outer-loop power control on the reverse link, the base station computes the FER in consecutive windows, each being an integer number of frames in duration. Thus, in each window, FER may be expressed as the number of frames with errors divided by the number of frames per window. Typically, the duration of a window is 20 frames, although other window sizes (number of frames per window) could be used. For each window, the base station compares the computed FER with a reverse-link Target FER (TFER). If the computed FER is less than TFER, the base station decreases $(E_b/N_0)_{setpoint}$. Conversely, if the computed FER is greater than TFER, the base station increases $(E_b/N_0)_{setpoint}$. In this manner, a computed FER that exceeds the target FER drives the inner-loop power control to increase the reverse-link power, while a computed FER that is below the target FER drives the inner-loop power control to decrease the reverse-link power.

In the context of a CDMA family of protocols, the power control methods described in the preceding are sometimes referred to as "inner-loop power-control protocols" and "outer-loop power-control protocols." It should also be noted that additional or alternative methods of power control may be applied to either of the forward or reverse links.

With arrangement described above, an access terminal can engage in cellular voice or packet-data communications. Referring again to FIG. 3, and taking an originating call from AT 302 as an example, AT 302 first sends an origination request over air interface 303 and via the BTS 304 and BSC 306 to MSC 308. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 316 by way of PCF 314. The PDSN 316 and access terminal 302 then negotiate to establish a data link layer connection, such as a point to point protocol (PPP) session. Further, the PDSN 316 sends a foreign agent advertisement that includes a challenge value to the access terminal, and the access terminal responds with a mobile-IP registration request (MIP RRQ), including a response to the challenge, which the PDSN forwards to HA 322. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000. In particular, for each active AT in a sector, the serving base station uses a calculated frame error rate to set an outer-loop SNR threshold (i.e., the $(E_b/N_0)_{setpoint}$) and, in accordance with inner-loop power control protocols, issues appropriate power-control commands—power-up or power-down commands—to cause the $E_b/N_0$ of the signal received from the AT to converge to the threshold.

Operation in an IS-856 compliant communication system may be illustrated, again with reference to FIG. 3. To acquire packet data connectivity under IS-856, after an access terminal first detects an IS-856 carrier, the access terminal sends to its BSC (or RNC) 306 a UATI (Universal Access Terminal Identifier) request, and receives in response an UATI, which the access terminal can then use to identify itself in subsequent communications with the BSC. The access terminal then sends a connection-request to the BSC 306, and the BSC responsively invokes a process to authenticate the access terminal and to have the access terminal acquire a data link.

In particular, the BSC 306 sends an access request to an Access Network AAA (ANAAA) server (which may be different than the AAA server 320), and the ANAAA server authenticates the access terminal. The BSC 306 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 316 (via PCF 314), and the PDSN and access terminal then negotiate to establish a PPP data link. In addition, as in the IS-2000 process, the access terminal then sends an MIP RRQ to the PDSN, which the PDSN forwards to the HA 322, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. INTELLIGENT POWER CONTROL a. Operating Principles

Figure 4:
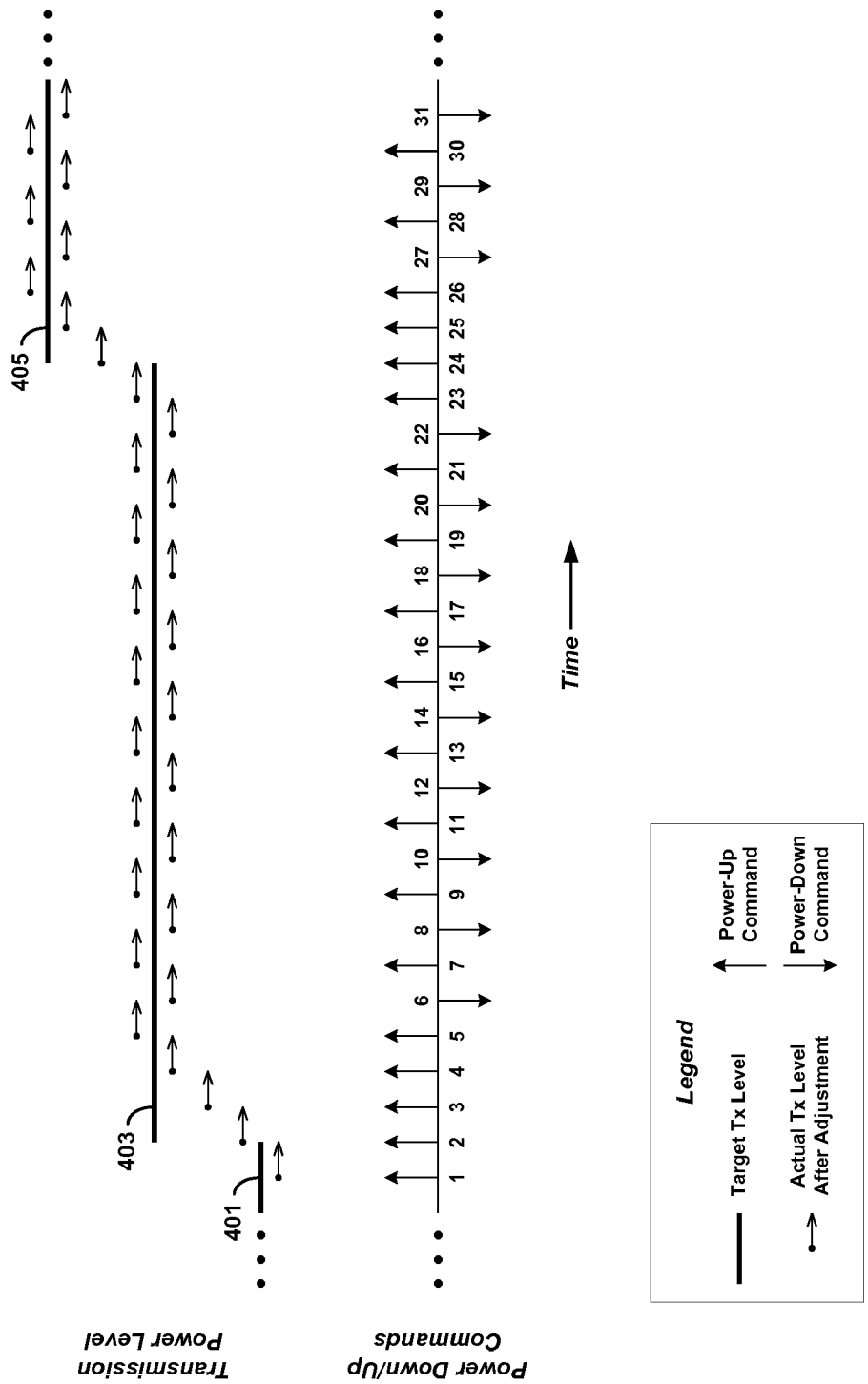
FIG. 4 illustrates an example of conventional power control in terms of sequences of power-control commands.

FIG. 4 illustrates conventional operation of power control as a function of time for example sequences of power-up and power-down commands that achieve and maintain target transmission power levels. Example target transmission levels as well as example "actual" transmission power levels resulting from power adjustments are shown in a top panel of FIG. 4. The power-control commands received by the sending entity are shown in a bottom panel of FIG. 4. As indicated, time increases towards the right in the figure. For the purpose of describing the process from the point of view of the sending entity, the target transmission power levels shown in FIG. 4 are taken to correspond to transmission power levels on the sending entity's air interface that are needed achieve the required threshold level at the receiving entity, and are not the received power at the receiving entity. Note, however, that in practice the sending entity does not know what the target level is, only that it needs to adjust its transmission power level up or down in accordance with each received power-control command. As with the discussion of FIG. 1, the sending entity could be an access terminal and the receiving entity a base station, or vice versa.

As indicated in the Legend in FIG. 4, the target transmission power levels in the top panel are represented by thick horizontal lines ("Target Tx Level" in the Legend). Also as indicated in the Legend, power-up commands are represented by upward-directed arrows, while power-down commands are represented by downward-directed arrows. A number below each power-up command and above each power-down command in the bottom panel corresponds to the order of arrival of the command at the sending entity, and provides a label for the convenience of the discussion herein. The time position of each command in the bottom panel represents the arrival time at the sending entity. The actual transmission power levels after the sending entity increases or decreases the transmission power level in response to a received power-control command are represented in the top panel by the short, rightward-directed, horizontal arrows ("Actual Tx Level After Adjustment" in the Legend). The dot at the left each arrow is time-aligned with the particular power-control command that caused the sending entity to make the adjustment. By way of example, the adjustment made in response to each power-up command is taken to be 1 dB up, and the adjustment made in response to each power-down command is taken to be 1 dB down. However, other amounts of adjustment could be made in response to the commands.

Three example target transmission power levels, target Tx level 401, 403, and 405, are depicted in FIG. 4. As noted, each is to a transmission power level that needs to be achieved by the sending entity in order to satisfy the threshold level at the receiving entity. As such, they depict evidently to discontinuous jumps in the received-power requirements at the receiving entity. There can be at least two reasons for such discontinuous jumps. The first reason is a change in the threshold level at the receiving entity, as determined according to the outer-loop control protocols described above. The second reason is a sudden change in operating conditions of the sending entity, the receiving entity, or both. For example, if the receiving entity is an access terminal that suddenly enters a zone of poor coverage (or suffers fading effects), the power it receives on its forward link could suddenly drop. The access terminal would correspondingly require a sudden increase in received power. Either or both of these reasons (as well as possibly others) could apply to the example illustrated in FIG. 4.

At the initial time represented in FIG. 4, the target Tx level 401 is in effect. As indicated, response to power-up command #1 results in an actual Tx level that is evidently below the target. Response to power-up command #2 then results an actual Tx level that is above the target. The target level then evidently jumps to target Tx level 403. Power-up commands #3-5 then bring the actual Tx level just above the new target level (403). Target Tx level 403 persists to approximately power-control command #23, and then jumps to target Tx level 405. Between power-control commands #5 and #23, the actual Tx level is stable with respect to the target level. However, the stability is maintained through a sequence of alternating power-up and power-down commands. That is, since power-up command #5 results an actual Tx level above the target, the receiving entity next sends a power-down command (#6). In response, the sending entity decreases its actual Tx level to just below the target, so the sending entity next sends a power-up command (#7), and so on until the target level jumps to target Tx level 405. Consecutive power-up commands #23-26 then achieve the new target, and stable operation again ensues for power-control commands #27-31 and possibly beyond (as indicated by the ellipses).

The 18 alternating power-up and power-down commands (#5-23) that maintain steady power about target Tx level 403 do so by causing the sending entity to alternatingly increase and decrease the transmission power on its air interface. This "flip-flop" of transmission power can be an inefficient and unnecessary cycling of transmission power levels when the target level is otherwise constant for an extended period of time. In accordance with an example embodiment of intelligent power control, the sending entity advantageously recognizes such extended periods of constant target power levels through tracking the number of alternating power-up and power-down commands received, and then advantageously ceases to respond to further power-control commands until it recognizes that the target power level has changed. The sending entity then begins responding again to power control commands.

b. Example Operation

Figure 5:
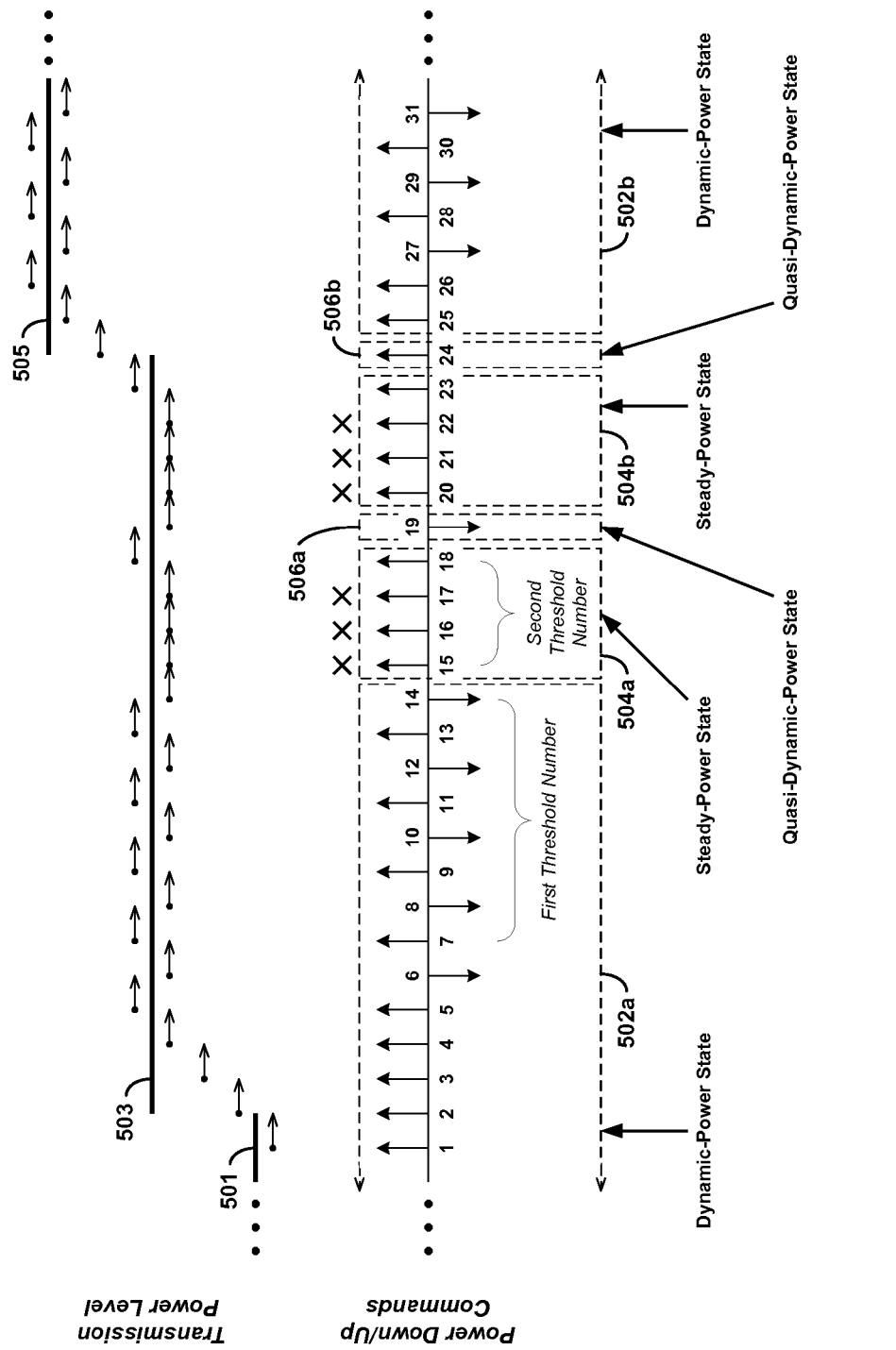
FIG. 5 illustrates an example of operation of intelligent power control in terms of sequences of power-control commands.

FIG. 5 illustrates the operating principles of intelligent power control by way of example operation of a sending entity in response to example sequences of power-control commands. The format and the meaning of the symbols shown in FIG. 5 are the same as those used in FIG. 4. Operation of the sending entity is explained in terms of the three operating states described in connection with FIG. 2. The example target transmission power levels are also the same as those shown in FIG. 4, but relabeled as target Tx levels 501, 503, and 505.

The sending entity is initially operating in dynamic-power state 502a, depicted by the open-ended dashed rectangle (open side at the left side indicates that the state may have persisted prior to the initial time in FIG. 5). While operating in dynamic-power state 502a, the sending entity receives power-control commands #1-14, which are the same as those for FIG. 4, and to which the sending entity responds as described in FIG. 4. Operation of the sending entity in the dynamic-power state is largely the same as that for conventional operation, except that the sending entity keeps track of the sequences of received power-control commands. Specifically, the sending entity can recognize when it receives a first threshold number of alternating power-up and power-down commands. By way of example, the first threshold number is taken to be eight, and the corresponding sequence is power-control commands #7-14. Other numbers could be used for the first threshold; furthermore, the first threshold number could be counted in terms of pairs of alternating power-control commands (e.g., four pairs in the present illustration).

Upon receiving the first threshold number of alternating power-control commands, the sending entity transitions to the steady-power state 504a, depicted by the next (in time) dashed rectangle. In this state, the sending entity does not adjust transmission power on its air interface in response to received power-control commands until it receives a particular sequence of commands. Specifically, upon receiving a second sequence of a second threshold number of consecutive commands that are each of a type opposite that of the "last" command received in the dynamic-power state, the sending entity responds to the last command of the second sequence, and then transitions to the quasi-dynamic-power state 506a (next dashed rectangle rightward).

By way of example, the "last" command received in the dynamic-power state (#14) is a power-down command, and the second threshold number is taken to be four. As indicated by the "X" above each of the first three power-up commands (#15-17) received while in the steady-power state, the sending entity remains at the power level last adjusted according to power-control command #14. The sending entity then responds to the fourth of the four power-up commands (#18) by incrementing the its transmission power and then transitioning to quasi-dynamic-power state 506a. Advantageously, the sending entity has avoided adjusting the transmission power on its air interface for three of the four power-control received during the steady state.

While in the quasi-dynamic-power state, the sending entity waits for just one power-control command to determine whether to transition back to the steady-power state or to the dynamic-power state. In the present example, the next power-control command is a power-down command (#19), indicating that the response to power-up command #18 was sufficient to achieve the threshold level (as shown by the actual Tx power level achieved in response to power-up command #18), thus indicating the target level has not changed. Consequently, the sending entity transitions to steady-power state 504b (next dashed rectangle rightward). Advantageously, this transition to the steady-power state does not require the first threshold number of alternating power-control commands, but just one, thereby avoiding a transition to the dynamic state when a steady target level still holds.

The example sequence of power-control commands shown during steady-power state 504b is the same as that for steady-power state 504a. Consequently, the sending entity operates in the same way as in state 504a, transitioning to quasi-dynamic-power state 506b (next dashed rectangle rightward) after incrementing transmission power in response to power-up command #23. However, in the present example operation, the target level evidently jumps from target Tx level 503 to target Tx level 505 somewhere between power-up commands #23 and #24. As a result, the actual Tx power level is below the target level even after the increment in response to power-up command #23. Thus, the one power-control command received during operation in quasi-dynamic-power state 506b is an additional power-up command (#24). In this instance, the sending entity advantageously recognizes that the target level has shifted upward, and responds by transitioning to the dynamic-power state 502b.

The sending entity remains in dynamic-power state 502b at least until the target Tx level 505 is achieved, which evidently occurs by power-up command #26 in the present example. The dashed rectangle representing dynamic-power state 502b is open toward the right, indicating that this state may persist beyond the last power-control command (#31). If the first threshold number of alternating commands should again be received during this state, the sending entity will again transition the steady-power state.

The operation illustrated in FIG. 5 does not show every possible combination of received power-control commands and state transitions. However, the example may be generalized to cover operation of the sending entity under other conditions of target Tx levels and other sequences of power-control commands. First, it may be noted that the first threshold number used to determine when to transition from the dynamic-power state to the steady-power state could be other than the value (eight) used in this example. In particular, a smaller number will cause a transition to occur sooner than a larger number, but a larger number might provide a more reliable indicator of when the target Tx level is on a long-term trend of near constancy. Similarly, the second threshold number could be other than the value (four) used in this example. A larger number will increase the duration of advantageous operation in the steady-power state, but may also cause the sending entity to delay responding to actual changes in the target Tx level.

Second, in an alternative or additional embodiment, the tally of alternating power control commands could associate the last command of the first threshold number with a power-down command, instead of a power-up command in the present example. This embodiment would accommodate downward movement of the target Tx levels during quasi-dynamic-power states. In this case, the explanation above would still apply, provided the types of commands received during the steady-power states and quasi-dynamic power states are replaced (by way of example) by the opposites of those in the example and the target Tx level 505 is below target Tx level 503.

Finally, the example in FIG. 5 omits the possibility that the first power-control command received during the steady-power state is of the same type as the last one during the immediately preceding dynamic-power state. In this case, the sending entity would recognize that the target Tx level just happened to change after the first threshold number of alternating power-control commands had been received, and by the time the sending entity transitioned to the steady-power state. Thus, the sending entity will transition back to the dynamic-power state in this instance.

4. ENHANCEMENT OF INTELLIGENT POWER CONTROL

In the example embodiment above, the receiving entity (i.e., the entity that issues power-control commands to the sending entity) is not necessarily aware that the sending entity (i.e., the entity that transmits data to the receiving entity) has transitioned to the steady-power state. Thus, the receiving entity may continue conventional operation even while the sending entity ignores power-control commands from the receiving entity. In particular, according to conventional operation, the receiving entity will begin to transmit consecutive power-control commands of the same type (e.g., all power-up or all power-down) once it determines that the sending entity is not responding to what had been strictly alternating power-increment and power-decrement commands. In accordance with the example embodiment of intelligent power control, the quasi-dynamic-power state of the sending entity is introduced in order to account for this expected, conventional behavior of the receiving entity. Thus, as illustrated by way of example in FIG. 5, a single power-control command received by the sending entity while operating in the quasi-dynamic-power state may lead to an immediate transition back to the steady-power state (e.g., power-down command #19). In this manner, the transition out of the steady-power state to the quasi-dynamic-power state and then back to the steady-power state can be as brief as possible (i.e., just one power-control command).

However, the consecutive power-control commands of the same type issued by the receiving entity could be due to a more substantive differential between the target power level and the sending entity's transmission level, rather than to simply the lack of response by the sending entity to power-control commands under conditions of otherwise stable transmission power about a target level. In this case, the transition to the quasi-dynamic-power state will be followed by a transition to the dynamic-power state, as illustrated by power-up command #24 in FIG. 5. In either case, the amount of time that the sending entity may operate in the steady-power state is, in accordance with the example embodiment of intelligent power control, generally limited to the second threshold number of consecutive power-control commands of the same type.

Accordingly, in an enhancement of intelligent power control, the receiving entity will be aware that a sending entity may enter a steady-power state after receiving a first threshold number of alternating power-control commands from the receiving entity, and the receiving entity will then expect the sending entity to ignore further power-control commands from the receiving entity. By operating in such a manner, the receiving entity may advantageously increase the amount of time that the sending entity may remain in the steady-power state under conditions of stable transmission power about a target level. Specifically, in accordance with an example embodiment of an enhancement of intelligent power control, the receiving entity will continue to transmit alternating power-increment and power-decrement commands to the sending entity even if the sending entity appears not to respond to any of those commands, so long as the sending entity's signal power level as measured at the receiving entity remains within a threshold of a target level.

a. Example Method

Figure 6:
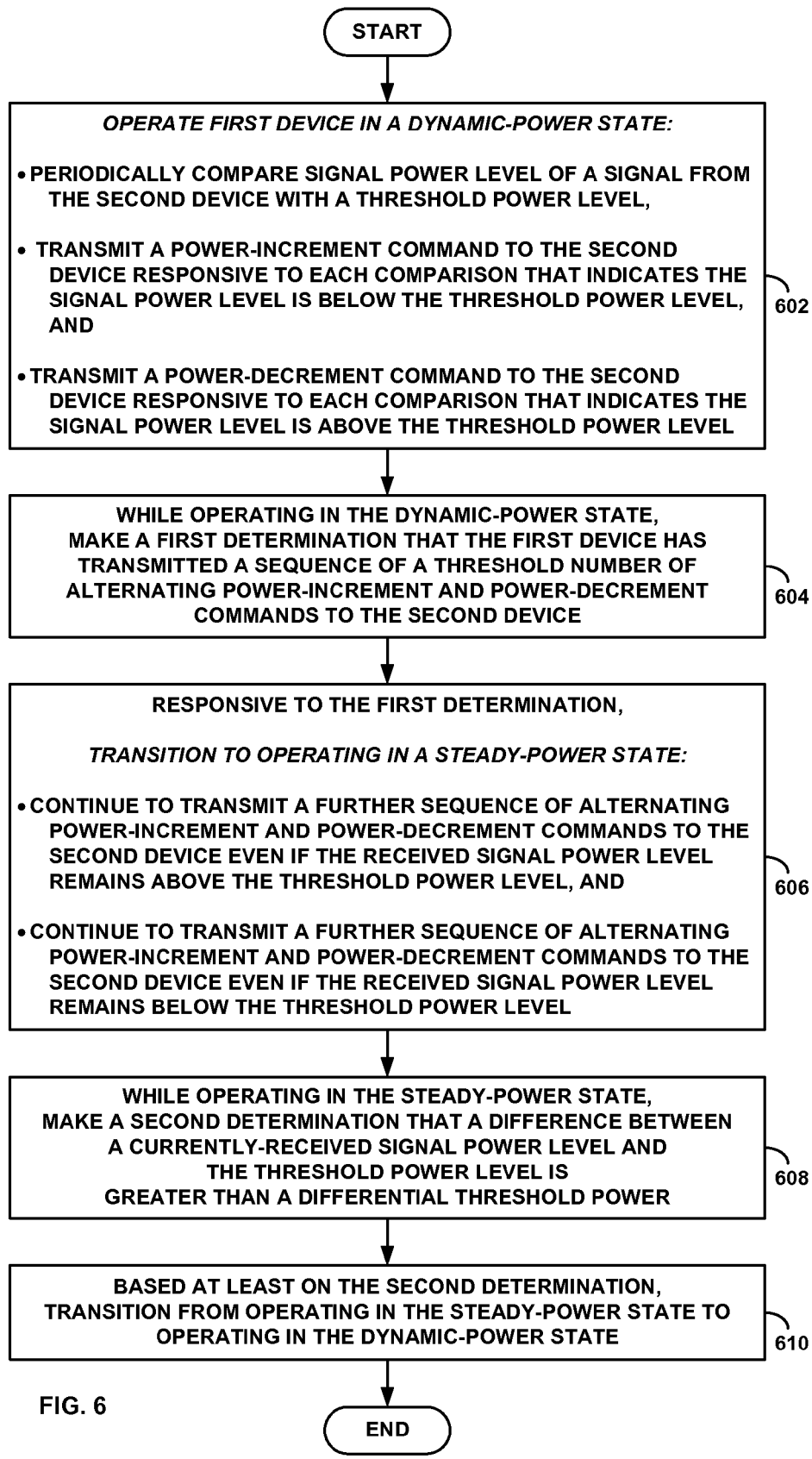
FIG. 6 is a flowchart illustrating an of an example embodiment of an enhancement of intelligent power control.

A method according to the example embodiment of an enhancement of intelligent power control is illustrated in FIG. 6 in the form of a flowchart. As with FIG. 1, the context for the example embodiment in FIG. 6 is a first device communicatively coupled with a second device via an air interface, wherein the steps of the flowchart are implemented in the first device. Also as with FIG. 1, the first and second devices could be in and/or be part of a wireless communication system that operates according to a CDMA family of protocols, and the air interface could be an RF interface. Unlike FIG. 1, however, the first device in FIG. 6 is taken to be a receiving entity defined in accordance with the description above, and the second device is taken to be a sending entity also defined in accordance with the description above. Thus, in one example configuration, the first device could be a base station that transmits power-control commands and the second device an access terminal that receives those power-control commands. In another example configuration, the first device could be an access terminal that transmits power-control commands and the second device a base station that receives those power-control commands. FIG. 6 applies to either or both example configurations, and the example embodiment of an enhancement of intelligent power control should be considered as encompassing an implementation of the steps of FIG. 6 in at least either or both an access terminal and a base station.

At step 602 the first device operates in a "dynamic-power" state, in which the first device periodically compares a signal power level of a signal from the second device with a threshold power level, and responsive to each comparison transmits either a power-increment command to the second device if the comparison that indicates the signal power level is below the threshold power level, or a power-decrement command to the second device if the comparison that indicates the signal power level is above the threshold power level. In keeping with the above descriptions, each power-increment and power-decrement command is a type of a power-control command. In accordance with the example embodiment of an enhancement of intelligent power control, the first device could be a base station that is part of a wireless communication system, and the second device could be an access terminal operating in the wireless communication system, wherein the wireless communication system is compliant with a CDMA family of protocols. As such, each power-increment command transmitted by the base station would be a power-up command transmitted to the access terminal on the forward link according to the inner-loop power-control protocol described above. Similarly, each power-decrement command transmitted by the base station would be a power-down command transmitted to the access terminal on the forward link according to the inner-loop power-control protocol. Each comparison made by the first device of the received power level would also be carried out in accordance with the inner-loop power-control protocol.

Alternatively or additionally, the first device could be an access terminal operating in the CDMA-compliant wireless communication system, and the second device could be base station that is part of the wireless communication system. In this case, each power-increment command transmitted by the access terminal would be a power-up command transmitted to the base station on the reverse link according to the inner-loop power-control protocol, and each power-decrement command transmitted by the access terminal would be a power-down command transmitted to the base station on the forward link according to the inner-loop power-control protocol. In either case, each power-up or power-down command would be an instruction to the second device to respectively increase or decrease its transmission power, wherein the increase or decrease could be measured in an absolute amount of transmission power or a fractional amount (relative to a current transmission power level).

At step 604, the first device, while operating in the dynamic-power state, makes a first determination that it has transmitted a sequence of a threshold number of alternating power-increment and power-decrement commands to the second device. In accordance with the inner-loop power-control protocol, the first determination would correspond to the first device having measured a signal power level of the signal received from the second device that has alternated above and below the threshold power level during a course of a corresponding sequence of comparisons of signal power level of the received signal with the threshold power level. Thus, the first determination corresponds to an indication to the first device of a relatively constant received power level with respect to the threshold power level.

In accordance with the example embodiment of an enhancement of intelligent power control, in addition to transmitting each power-control command, the first device can keep track of the transmitted power-control commands in order to determine if and when it has transmitted the sequence of the threshold number of alternating power-increment and power-decrement commands to the second device. For instance, the first device may accumulate a count of alternating power-increment and power-decrement commands in some form of memory (such as internal "random-access memory" or magnetic disk). Further, in the case where the first device is a base station, it may maintain a separate count for each access terminal that it is currently serving.

Note that the threshold number could correspond to a number of pairs of alternating power-increment and power-decrement commands. Alternatively, the threshold number could correspond to a total number of power-control commands in a sequence comprised of strictly alternating power-increment and power-decrement commands. Additionally, the threshold number of alternating power-increment and power-decrement commands could correspond to a sequence of power-control commands that begins with either a power-increment command or a power-decrement command, and similarly ends with either a power-increment command or a power-decrement command.

Having transmitted the sequence of the threshold number of alternating power-up and power-down commands to the second device, the first device can then expect the second device to begin to ignore further power-control commands, in accordance with the example embodiment of intelligent power control described above. Hence, in accordance with the example embodiment of an enhancement of intelligent power control, at step 606 the first device, responsive to the first determination, will transition to a "steady-power" state in which the first device continues to transmit a further sequence of alternating power-increment and power-decrement commands to the second device even if the first device detects that the second device is not responding to the alternating power-control commands. More particularly, operating in the steady-power state, the first device will continue to transmit alternating power-increment and power-decrement commands to the second device even if the received signal power level from the second device remains above the threshold power level during transmission of the alternating power-control commands, or remains below the threshold power level during transmission of the alternating power-control commands.

In further accordance with the example embodiment of an enhancement of intelligent power control, the first device will continue to transmit alternating power-increment and power-decrement commands to the second device subject to a condition that the signal power level of the signal received from the second device remains in an acceptable range. More specifically, the range can be divided into two sub-ranges: one being from the threshold power level to the differential threshold power above the threshold power level, and the other being from the threshold power level to the differential threshold power below the threshold power level. Thus, while operating in the steady-power state, the first device may observe that the received power level remains continually above the threshold, but not by an amount greater than the differential threshold power. Conversely, the first device may observe that the received power level remains continually below the threshold, but, again, not by an amount greater than the differential threshold power. At the same time, the first device will continue to transmit alternating power-up and power-down command, even though the received power level indicates that the second device is ignoring the commands.

Advantageously, then, the second device may remain at a relatively constant power level with respect to the threshold level without being forced to continually increase and decrease its power in response to alternating power-up and power-down commands transmitted by the first device. That is, operation of the first device according to the example embodiment of an enhancement of intelligent power control allows the second device to more efficiently operate according to the example embodiment of intelligent power control.

At step 608, the first device, while operating in the steady-power state, makes a second determination that the difference between a currently-received signal power level and the threshold power level is greater than the differential threshold power. More particularly, the first device may determine that the currently-received signal power level is either higher than the differential threshold power above the threshold power level, or lower than the differential threshold power below the threshold power level. The second determination thus indicates that the currently-received signal power level has move outside of the acceptable range. In accordance with the example embodiment of an enhancement of intelligent power control, the currently-received signal power level could move outside of the acceptable range because the transmission power of the second device has changed sufficiently to cause the received power at the first device to exceed the acceptable range, or because the threshold power level may have changed to a new threshold power level such that the difference between the currently-received signal power level and the new threshold power level is now greater than the differential threshold power, or both. In the latter case, the threshold power level may have changed to the new threshold power level in accordance with the outer-loop power-control protocol described above (i.e., the threshold power level corresponds to $(E_b/N_0)_{setpoint}$).

Finally, at step 610 the first device transitions from operating in the steady-power state to operating in the dynamic-power state, based at least on the second determination. Thus, the second determination made at step 608 signals a divergence between the received signal power and the threshold power level that requires corrective action. By transitioning back to the dynamic-power state, the first device will then issue appropriate power-control commands to the second device in order to bring about the requisite correction. In particular, after transitioning to back to the dynamic-power state, the first device will likely issue a sequence of consecutive power-control commands of the same type (all power-up or all power-down). In accordance with the example embodiment of intelligent power control, the second device will (after receiving a sufficient number of consecutive power-control commands of the same type) begin responding again to the power control commands.

It will be appreciated that the steps of FIG. 6 are exemplary, and that additional and/or alternative steps or alternative ordering of steps could be carried out and still remain within the scope and spirit of the present invention.

Figure 7:
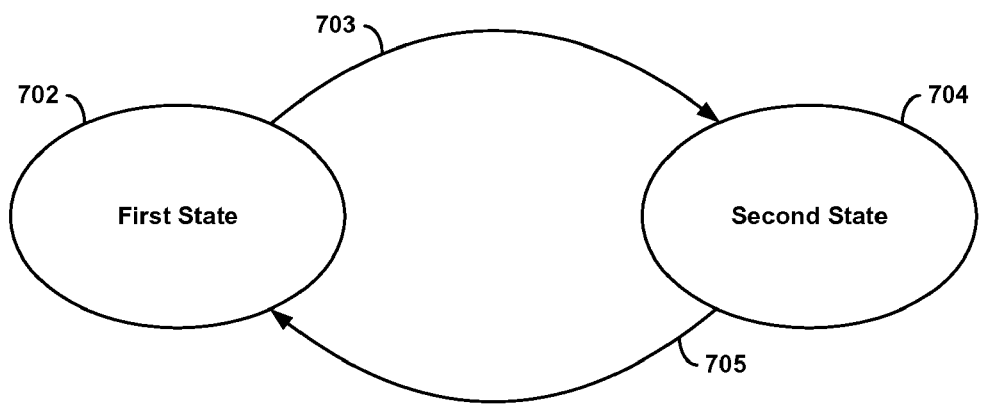
FIG. 7 illustrates operation of an example embodiment of an enhancement of intelligent power control in the form of a state diagram.

FIG. 7 illustrates the arrangement of states and transitions associated with the example embodiment of an enhancement of intelligent power control illustrated in FIG. 6. In the figure, a dynamic-power state 702 (labeled "First State") and steady-power state 704 (labeled "Second State") are connected by transition 703 from state 702 to state 704 and transition 705 from state 704 to state 702. Operation of the first device in the dynamic-power state 702 corresponds to operation according to step 602 in FIG. 6, for example. Similarly, operation of the first device in the steady-power state 704 corresponds to operation according to step 606 in FIG. 6. Transition 702 corresponds to the first determination by the first device that it has transmitted the threshold number of alternating power-increment and power-decrement commands (e.g., step 604 in FIG. 6). Transition 705 corresponds to the second determination that the difference between a currently-received signal power level and the threshold power level is greater than the differential threshold power (e.g., step 608 in FIG. 6).

b. Example Operation

Figure 8:
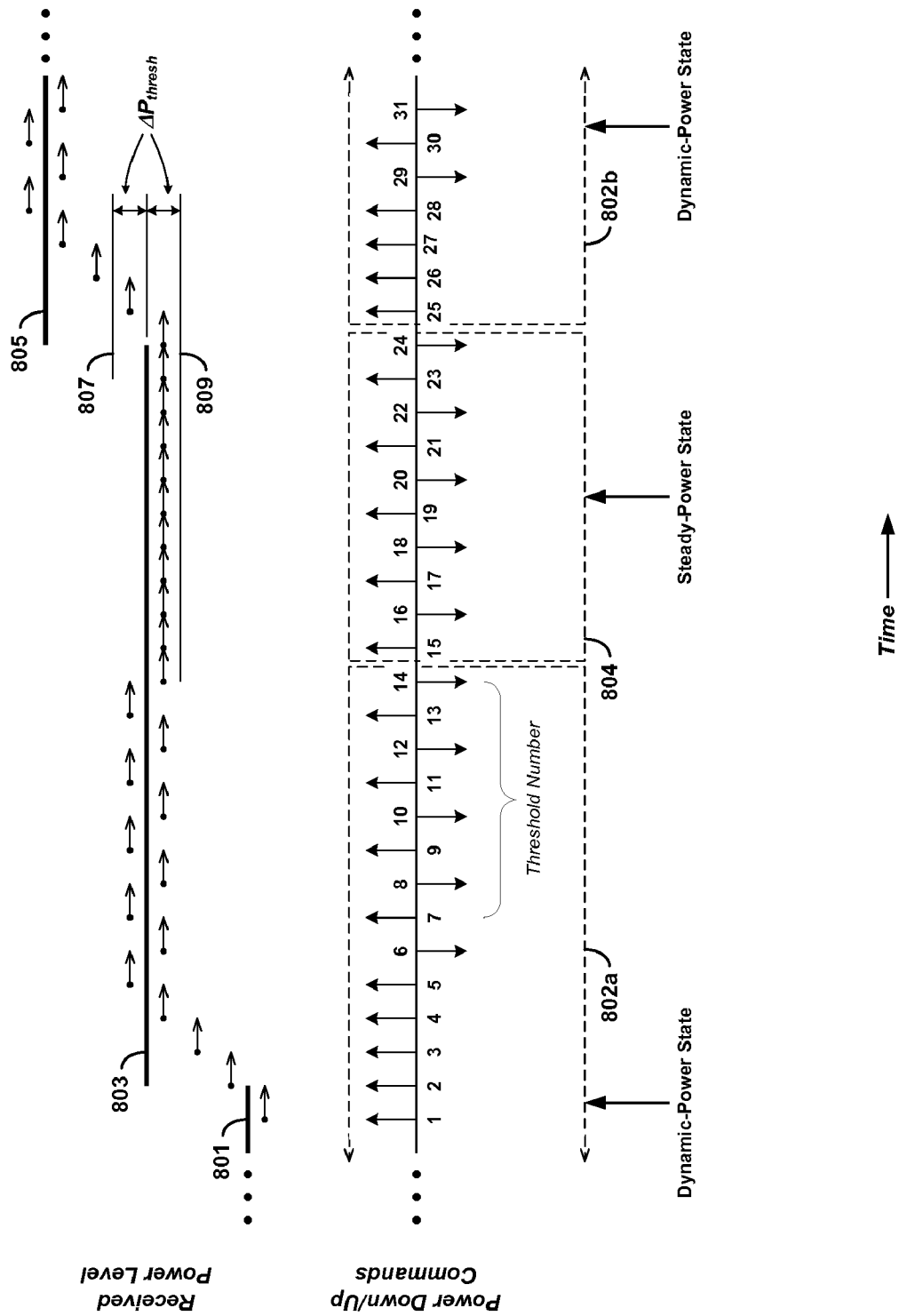
FIG. 8 illustrates operation of an example embodiment of an enhancement of intelligent power control in terms of example sequences of power-control commands.

FIG. 8 illustrates operation of a receiving entity in response to example sequences of transmitted power-control commands in accordance with the example embodiment of an enhancement of intelligent power control. The format and the meaning of the symbols shown in FIG. 8 are the same as those used in FIGS. 4 and 5, except that in FIG. 8 the target power levels (thick horizontal lines) and the actual power levels after adjustment (horizontal arrows) correspond to received ("Rx") power levels as measured or detected at the receiving entity. Operation of the receiving entity is explained in terms of the two operating states described in connection with FIG. 7. The example target received power levels correspond to the target transmission levels shown in FIG. 4, but are relabeled as target Rx levels 801, 803, and 805.

The receiving entity is initially operating in dynamic-power state 802a, depicted by the open-ended dashed rectangle (open side at the left side indicates that the state may have persisted prior to the initial time in FIG. 8). While operating in dynamic-power state 802a, the receiving entity transmits power-control commands #1-14, which corresponds to the power-control commands received at the sending entity in FIG. 4, and to which the sending entity responds as described in the discussion of FIG. 4. Operation of the receiving entity in the dynamic-power state is largely the same as that for conventional operation (e.g., as described at step 602 in FIG. 6), except that the receiving entity keeps track of the sequences of transmitted power-control commands. Specifically, the receiving entity can recognize when it has transmitted a sequence of a threshold number of alternating power-up and power-down commands. By way of example, the first threshold number is taken to be eight, and the corresponding sequence is power-control commands #7-14. Other numbers could be used for the threshold number; furthermore, the threshold number could be counted in terms of pairs of alternating power-control commands (e.g., four pairs in the present illustration).

Upon determining that it has transmitted the first threshold number of alternating power-control commands, the sending entity transitions to the steady-power state 804, depicted by the next (in time) dashed rectangle. In this state, the receiving entity continues to transmit alternating power-up and power-down commands, even if it detects that the sending entity is not responding to those commands. This behavior is illustrated by way of example in FIG. 8 in power-control commands #15-24, which alternate between power-up and power-down even while the actual Rx level from the sending entity remains below the target level 803 shown in the top panel of the figure. Advantageously, this behavior of the receiving entity while operating in the steady-power state allows the sending entity to remain acceptably close to the target (threshold) power level, but without having to continually adjust its transmission power level above and below that target.

In accordance with the example embodiment of an enhancement of intelligent power control, the receiving entity remains in the steady-power state as long as the Rx power from the sending entity remains within the differential threshold $\Delta P_{thresh}$ above or below the target Rx level. More particularly, the receiving entity will continue to transmit alternating power-up and power-down commands as long as the Rx level remains either in an upper sub-range between the target Rx power level and $\Delta P_{thresh}$ above the target Rx level, or in a lower sub-range between the target Rx power level and $\Delta P_{thresh}$ below the target Rx level. The upper sub-range is depicted in FIG. 8 as the horizontal region between the target Rx level 803 and the upper limit 807 $\Delta P_{thresh}$ above the target Rx level 803. Similarly, the lower sub-range is depicted as the horizontal region between the target Rx level 803 and the lower limit 809 $\Delta P_{thresh}$ below the target Rx level 803. By way of example in the illustration of FIG. 8, the actual Rx power level of transmissions from the sending entity remains within the lower sub-range for the duration of alternating power-control commands #15-24.

Conditions for the receiving entity to remain in the steady-power state persist until the threshold power level evidently jumps, by way of example, from target Rx level 803 to target Rx level 805, somewhere between power-down command #24 and power-up command #25 (also by way of example). As a result, the actual Rx power level moves out of the acceptable range after power-down command #24. In accordance with the example embodiment of an enhancement of intelligent power control, the receiving entity then responds by transitioning back to operation in the dynamic-power state 802b, depicted as the dashed rectangle open toward the right. The receiving entity then transmits consecutive power-up commands #25-28, causing the sending entity to again respond to power-control commands by (in the present example) increasing it transmission power in a stepwise manner. Correspondingly, the receiving entity detects the stepwise increase in the Rx power level, until the Rx level rises just above the target Rx level 805 in response to power-up command #28. The remaining, alternating power-control commands #29-31 in this illustration maintain the actual Rx level about the target Rx level in accordance with conventional operation (and the dynamic-power state of the receiving entity). If the receiving entity continues to transmit a sufficient number of alternating power-up and power-down commands to the sending entity (i.e., if the actual Rx level remains relatively constant about the target Rx level 805), the receiving entity will again transition to operating in the steady-power state, in accordance with the example embodiment of an enhancement of intelligent power control.

As with the example illustrated in FIG. 5, the operation illustrated in FIG. 8 does not show every possible combination of transmitted power-control commands and state transitions. However, the example may be generalized to cover operation of the receiving entity under other conditions of target Rx levels and other sequences of power-control commands. Further, it may be noted that the threshold number used to determine when to transition from the dynamic-power state to the steady-power state could be other than the value (eight) used in this example. In particular, a smaller number will cause a transition to occur sooner than a larger number, but a larger number might provide a more reliable indicator of when the target Rx level is on a long-term trend of near constancy.

5. IMPLEMENTATION OF EXAMPLE EMBODIMENTS

The example embodiment of intelligent power control described above can be implemented as a method in a sending entity, such as an access terminal in or a base station that is part of a wireless communication system that operates according to a CDMA family of protocols, such as the one described above in connection with FIG. 3. Similarly, the example embodiment of an enhancement of intelligent power control can be implemented as a method in a receiving entity, which can also be an access terminal in or a base station. The next two subsections provide, respectively, logical steps and operations of the method of example embodiment of intelligent power control in a sending entity and logical steps and operations of the method of the example embodiment of an enhancement of intelligent power control in a receiving entity. Example means for carrying out the both methods in an access terminal and in a base station are described in the subsequent subsections.

a. Example Method in the Sending Entity

Figure 9:
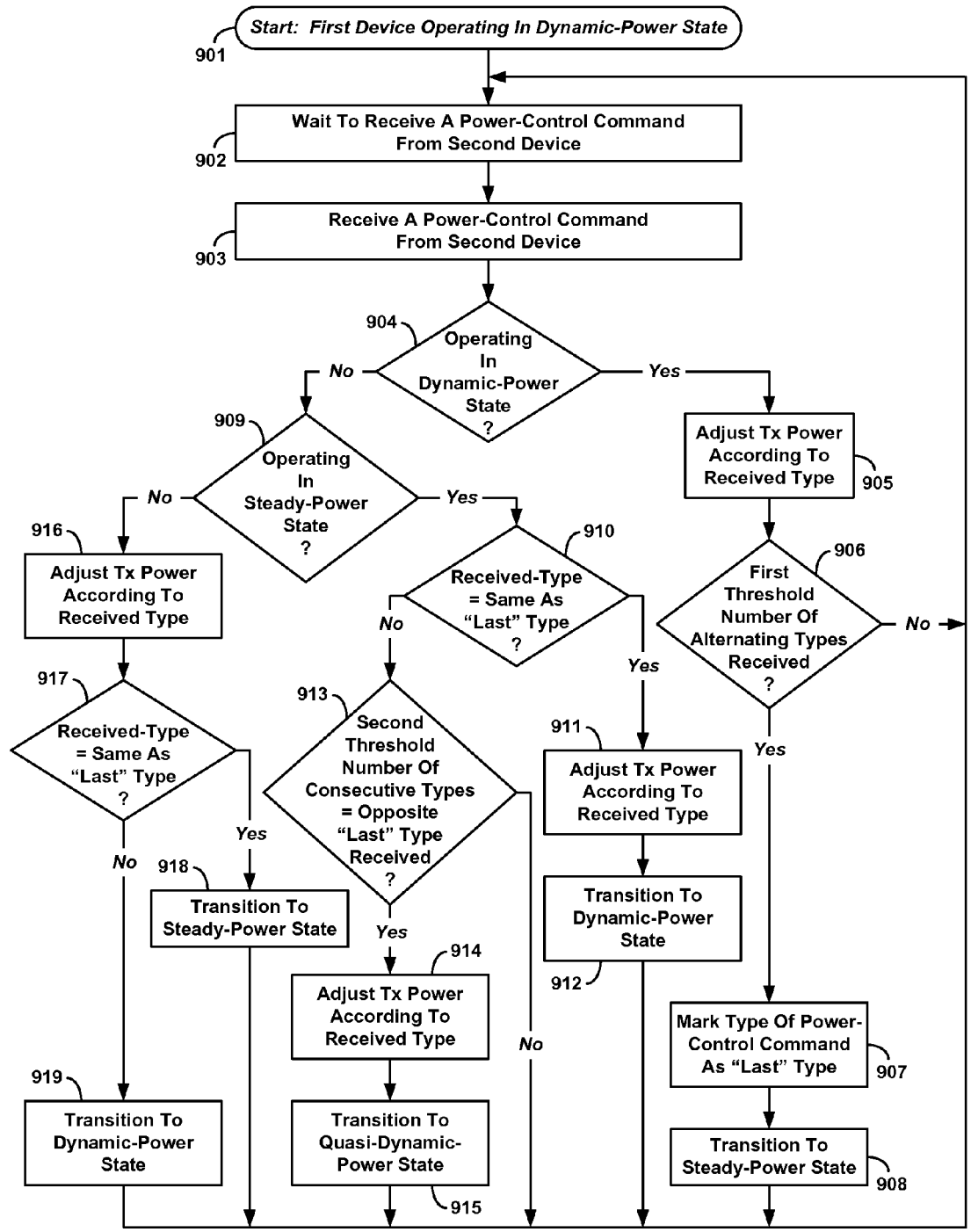
FIG. 9 illustrates an example set of logical process steps for implementing an example embodiment of intelligent power control.

FIG. 9 depicts an example method carried out by a sending entity of the example embodiment of intelligent power control in the form of a logical flowchart. The steps could be implemented as software, firmware, and/or hardware instructions stored in physical memory of a suitable sending entity, and executed by one or more general purpose and/or special purpose processors. In FIG. 9, the sending entity is referred to as the first device and the receiving entity is referred to as the second device, wherein the first device receives power-control commands from the second device.

In practice, each power-control command is one of two opposite types. That is, a power-up (or more generally, power-increment) command is the opposite type from a power-down (or more generally, power-decrement) command, and vice versa. Moreover, in accordance with the example operation discussed above, the behavior of the sending entity can be described in terms of the relative types of received power-control commands. Therefore, in the description of the method illustrated in FIG. 9, different power-control commands are compared to each other either as being "same types" or "opposite types," and without specific reference to specific types (e.g., power-up or power-down). Similarly, adjustments of the transmission power of the sending entity's air interface in response to power-control commands are referred to as being taken in accordance with the types of power control commands.

At the start 901 of the intelligent power-control method in FIG. 9, the first device is, by way of example, operating in the dynamic-power state, in which the first device responds to each received power-control command in accordance with the type of each command, as explained above. After responding to a given power-control command, the first device waits (step 902) to receive a next power-control command from the second device, and at step 903, the first device receives a power-control command from the second device.

The first device's response to the received command depends on its current operating state. At step 904, the first device determines whether or not it is operating in the dynamic-power state. For instance, the first device may maintain a status value in its memory that indicates its current operating state. If the first device is operating in the dynamic-power state ("Yes" branch from step 904), then the first device adjusts its Tx power level (step 905) according to the type of power control command received at step 902. Then at step 906, the first device determines whether or not it has received the first threshold number of alternating types of power-control commands, wherein the power-control command received at step 902 is included in the determination. For example, the first device can keep track in its physical memory of the types of received power-control commands in order to be able to identify a first sequence of a first threshold number of alternating commands.

If the first threshold number has not been received ("No" branch from step 906), then the first device returns to step 902, again waiting for a next power-control command. If the first threshold number has been received ("Yes" branch from step 906), then the first device takes note (step 907) of the type of the power-control command received at step 902. For instance, the type may be recorded in the physical memory of the first device. For the convenience of the present discussion, the type is labeled as the "Last" type, where "Last" refers the last of the sequence of alternating power-control commands. The first device then transitions to the steady-power state (step 908), and returns to step 902 to wait for a next power-control command. In this case, the first device has advantageously recognized that the target Tx level is constant, and therefore the device should operate in the steady-power state. In transitioning to the steady-power state, the first device may change a status indicator that it uses when determining its current state.

If the determination at step 904 is that the first device is not operating in the dynamic-power state ("No" branch from step 904), the first device then determines at step 909 whether or not it operating in the steady-power state. Again, a memory-stored status indicator may be consulted to make this determination. If the first device is operating in the steady-power state ("Yes" branch from step 909), the first device then determines at step 910 whether or not the type of the power-control command received at step 902 is the same as the "Last" type. If the received-type is the same as the "Last" type ("Yes" branch from step 910), the first device adjusts its Tx power level (step 911) according to the type of power control command received at step 902, transitions (step 912) back to the dynamic-power state, and then returns to step 902 to wait for a next power-control command.

If the received-type is not the same as the "Last" type ("Yes" branch from step 910), then the first device determines at step 913 whether or not the second threshold number of consecutive types opposite that of the "Last" type has been received, wherein the determination includes the type of the power-control command received at the most recent traversal of step 902. As with the test of the first threshold number (step 906), the first device can keep track in its physical memory of the types of received power-control command in order to be able to identify a second sequence of a second threshold number of consecutive commands that are opposite the "Last" type. If the second threshold number has not been received ("No" branch from step 913), then the first device returns to step 902 to wait for a next power-control command. Note that in this case, the first device makes no Tx power adjustment in response to the power-control command received at the most recent traversal of step 902, thus advantageously avoiding power flip-flops when the target Tx level is constant.

If the second threshold number has been received, ("Yes" branch from step 913), the first device adjusts its Tx power level (step 914) according to the type of power control command received at step 902, transitions (step 915) to the quasi-dynamic-power state, and then returns to step 902 to wait for a next power-control command.

If the determination at step 909 is that the first device is not operating in steady-power state ("No" branch from step 909), then in accordance with there being three states, the first device must be operating in the quasi-dynamic-power state. In this case, the first device adjusts its Tx power level (step 916) according to the type of power control command received at step 902, and then determines at step 917 whether or not the type of the power-control command received at step 902 is the same as the "Last" type. If the received-type is the same as the "Last" type ("Yes" branch from step 917), the first device transitions (step 918) to the steady-power state, and then returns to step 902 to wait for a next power-control command. If the received-type is not the same as the "Last" type ("No" branch from step 917), the first device transitions (step 919) to the dynamic-power state, and then returns to step 602 to wait for a next power-control command.

It will be appreciated that the steps shown in FIG. 9 are meant to illustrate operation of an example embodiment in a sending entity. As such, various steps could be altered or modified, and the ordering of certain steps could be changed, while still achieving the overall desired operation. In addition, it should be noted that if the sending entity is a base station (or BTS), the method illustrated in FIG. 9 would, in practice, be carried out separately for each access terminal (receiving entity, in this case) that sends power-control commands to the base station.

b. Example Method in Receiving Entity

Figure 10:
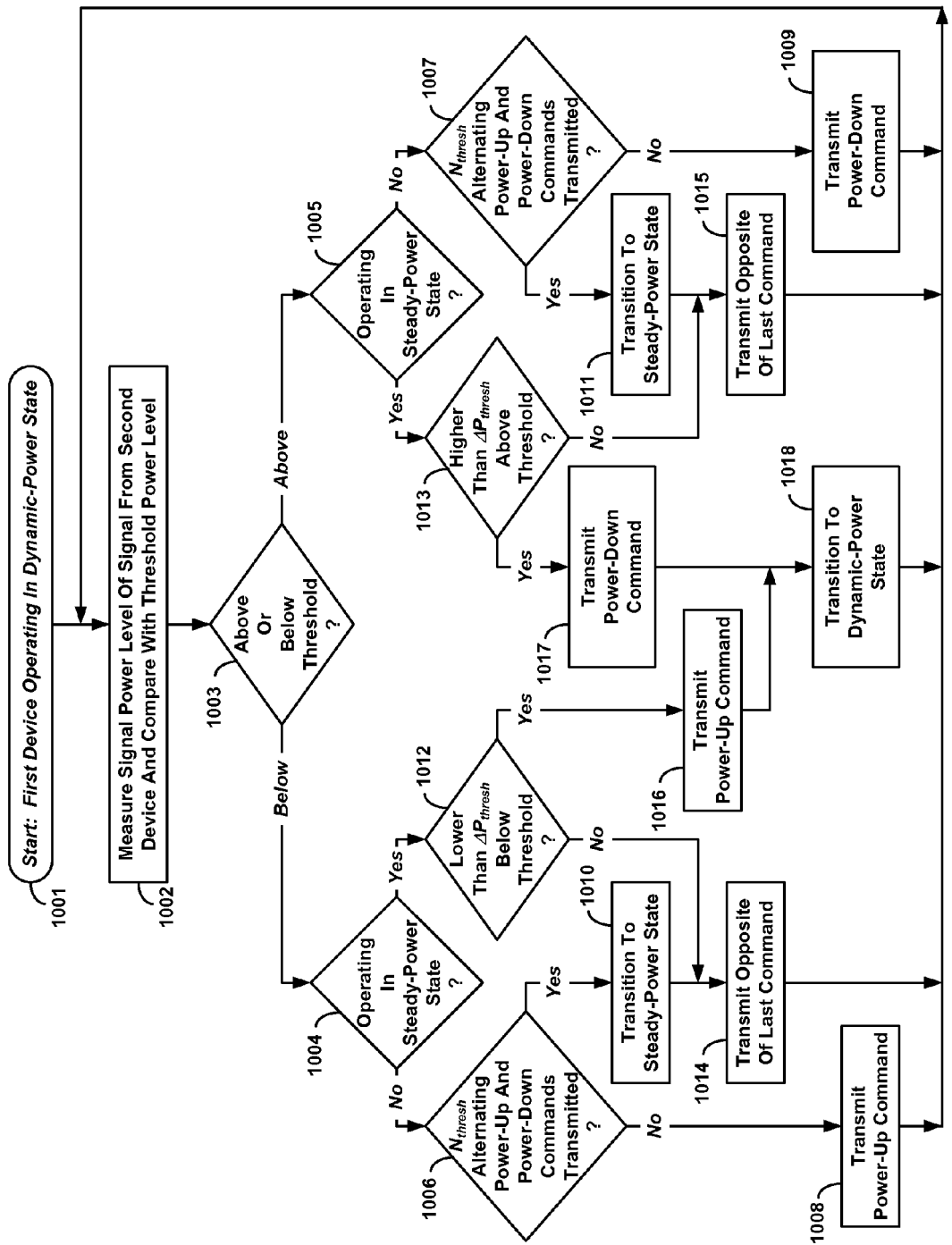
FIG. 10 illustrates an example set of logical process steps for implementing an example embodiment of an enhancement of intelligent power control.

FIG. 10 depicts an example method carried out by a receiving entity of an example embodiment of an enhancement of intelligent power control in the form of a logical flowchart. The steps could be implemented as software, firmware, and/or hardware instructions stored in physical memory of a suitable sending entity, and executed by one or more general purpose and/or special purpose processors. In FIG. 10, the receiving entity is referred to as the first device and the sending entity is referred to as the second device, wherein the first device transmits power-control commands to the second device. Thus, the roles of the first device and of the second device with respect to receiving and sending entities in FIG. 10 are reversed from those in FIG. 9.

At the start 1001 of the enhanced intelligent power-control method in FIG. 10, the first device is, by way of example, operating in the dynamic-power state, in which the first device transmits power-control commands to the second device based on the power level of a signal received from the second device. Specifically, at step 1002, the first devices measures the power level of the signal received from the second device, and compares the measurement with a threshold power level. In accordance with outer- and inner-loop power-control protocols of CDMA-compliant operation, the threshold power level would correspond to $(E_b/N_0)_{setpoint}$, as described above. At step 1003, the first device determines if the received signal power level is above or below the threshold level. Operation then branches according to the determination. Specifically, if the received signal power level is below the threshold ("Below" branch from step 1003), the first device then determines at step 1004 if it is operating in the steady-power state. If the first device is not operating in the steady-power state ("No" branch from step 1004), then the first device (operating in the dynamic-power state) next determines (at step 1006) if it has transmitted a threshold number $N_{thresh}$ of alternating power-up and power-down commands to the second device. If it has not ("No" branch from step 1006), then the first device transmits a power-up command to the second device at step 1008, and then returns to step 1002, where it again checks the received signal power level against the threshold. This branch of operation of steps 1002→1003→1004→1006→1008→1002 corresponds to conventional operation of the first device in response to the received power level being below the threshold power level.

If at step 1006 the first device determines that it has transmitted $N_{thresh}$ of alternating power-up and power-down commands to the second device ("Yes" branch from step 1006), then the first device transitions to the steady-power state at step 1010, and at step 1014 transmits a power-control command of a type opposite that of its last (previous) transmitted power-control command. The first device then returns to step 1002, again making a comparison of the received signal power level from the second device against the threshold. This branch of operation of steps 1002→1003→1004→1006→1010→1014→1002 corresponds to the first device transitioning from operation in the dynamic-power state to operation in the steady-power state in response to the received power level being below the threshold power level.

If at step 1004 the first device is operating in the steady-power state ("Yes" branch from step 1004), then the first device (operating in the steady-power state) next determines (at step 1012) if the received signal power level is lower than the differential threshold $\Delta P_{thresh}$ below the threshold power level. If the received signal power level is not lower than $\Delta P_{thresh}$ below the threshold power level ("No" branch from step 1012), then at step 1014 the first device transmits a power-control command of a type opposite that of its last (previous) transmitted power-control command. The first device then returns to step 1002, again making a comparison of the received signal power level from the second device against the threshold. This branch of operation of steps 1002→1003→1004→1012→1014→1002 corresponds to the first device continuing to operate in the steady-power in response to the received power level being below the threshold power level. That is, in this case the first device detects that the second device in not responding the alternating power-control commands, but the received power level is nevertheless remaining within a range from the threshold power level to $\Delta P_{thresh}$ below the threshold power level. Thus the received power level is relatively constant with respect to the threshold level. Advantageously, the first device does not attempt to force the second device to adjust its transmission power level.

If at step 1012 the first device determines that if the received signal power level is lower than the differential threshold $\Delta P_{thresh}$ below the threshold power level ("Yes" branch from step 1012), then the first device transmits a power-up command to the second device at step 1016. Then at step 1018, the first device transitions back to the dynamic power state and again returns to step 1002 to check of the received signal power level from the second device against the threshold. This branch of operation of steps 1002→1003→1004→1012→1016→1018→1002 corresponds to the first device breaking out of operating in the steady-power in response to the received power level being below the threshold power level, and in particular in response to the received power level being lower than $\Delta P_{thresh}$ below the threshold power level.

If at step 1003, the first device determines that the received signal power level is above the threshold ("Above" branch from step 1003), then operation is similar to that starting with step 1004, except that the power-level comparisons consider upper-limits instead of lower limits. Specifically, if the received signal power level is above the threshold the first device then the first device then determines at step 1005 if it is operating in the steady-power state. If the first device is not operating in the steady-power state ("No" branch from step 1005), then the first device (operating in the dynamic-power state) next determines (at step 1007) if it has transmitted a threshold number $N_{thresh}$ of alternating power-up and power-down commands to the second device. If it has not ("No" branch from step 1007), then the first device transmits a power-down command to the second device at step 1009, and then returns to step 1002, where it again checks the received signal power level against the threshold. This branch of operation of steps 1002→1003→1005→1007→1009→1002 corresponds to conventional operation of the first device in response to the received power level being above the threshold power level.

If at step 1007 the first device determines that it has transmitted $N_{thresh}$ of alternating power-up and power-down commands to the second device ("Yes" branch from step 1007), then the first device transitions to the steady-power state at step 1011, and at step 1015 transmits a power-control command of a type opposite that of its last (previous) transmitted power-control command. The first device then returns to step 1002, again making a comparison of the received signal power level from the second device against the threshold. This branch of operation of steps 1002→1003→1005→1007→1011→1015→1002 corresponds to the first device transitioning from operation in the dynamic-power state to operation in the steady-power state in response to the received power level being above the threshold power level.

If at step 1005 the first device is operating in the steady-power state ("Yes" branch from step 1005), then the first device (operating in the steady-power state) next determines (at step 1013) if the received signal power level is higher than the differential threshold $\Delta P_{thresh}$ above the threshold power level. If the received signal power level is not higher than $\Delta P_{thresh}$ above the threshold power level ("No" branch from step 1013), then at step 1015 the first device transmits a power-control command of a type opposite that of its last (previous) transmitted power-control command. The first device then returns to step 1002, again making a comparison of the received signal power level from the second device against the threshold. This branch of operation of steps 1002→1003→1005→1013→1015→1002 corresponds to the first device continuing to operate in the steady-power in response to the received power level being above the threshold power level. That is, in this case the first device detects that the second device in not responding the alternating power-control commands, but the received power level is nevertheless remaining within a range from the threshold power level to $\Delta P_{thresh}$ above the threshold power level. Thus the received power level is relatively constant with respect to the threshold level. Advantageously, the first device does not attempt to force the second device to adjust its transmission power level.

If at step 1013 the first device determines that if the received signal power level is higher than the differential threshold $\Delta P_{thresh}$ above the threshold power level ("Yes" branch from step 1013), then the first device transmits a power-down command to the second device at step 1017. Then at step 1018, the first device transitions back to the dynamic power state and again returns to step 1002 to check of the received signal power level from the second device against the threshold. This branch of operation of steps 1002→1003→1005→1013→1017→1018→1002 corresponds to the first device breaking out of operating in the steady-power in response to the received power level being above the threshold power level, and in particular in response to the received power level being higher than $\Delta P_{thresh}$ above the threshold power level.

It will be appreciated that the steps shown in FIG. 10 are meant to illustrate operation of an example embodiment of an enhancement of intelligent power control in a receiving entity. As such, various steps could be altered or modified, and the ordering of certain steps could be changed, while still achieving the overall desired operation. In addition, it should be noted that if the receiving entity is a base station (or BTS), the method illustrated in FIG. 10 would, in practice, be carried out separately for each access terminal (sending entity, in this case) that receives power-control commands from the base station.

c. Example Access Terminal

Figure 11:
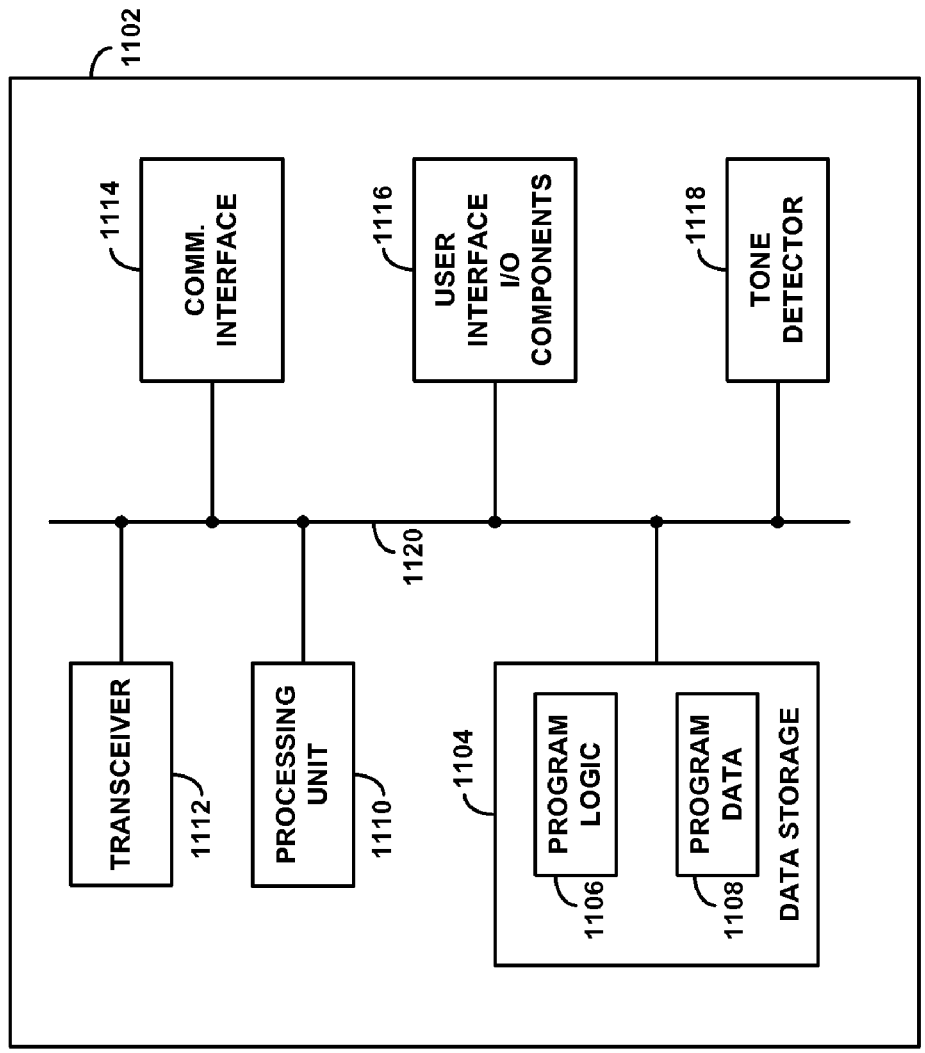
FIG. 11 is a block diagram of an example access terminal in which intelligent power control and an enhancement intelligent power control could be implemented.

FIG. 11 is a simplified block diagram depicting functional components of an example access terminal 1102 in which intelligent power control may be implemented according to either or both of the example embodiment of intelligent power control and the example embodiment of an enhancement of intelligent power control. The example AT 1102 could be a cell phone, a personal digital assistant (PDA), a pager, a wired or wirelessly-equipped notebook computer, or any other sort of device. As shown in FIG. 11, the example AT 1102 includes data storage 1104, processing unit 1110, transceiver 1112, communication interface 1114, user-interface I/O components 1116, and tone detector 1118, all of which may be coupled together by a system bus 1120 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 1102 relevant to intelligent power control are discussed briefly below.

Communication interface 1114 in combination with transceiver 1112, which may include one or more antennas, enables communication with the network, including reception of power-control commands on the AT's forward link from a serving base station (or BTS) and/or transmission of power-control commands on the AT's reverse link to the serving base station (or BTS). The communication interface may include a module, such as an MSM™-series chipset made by Qualcomm Inc. of San Diego, Calif., and supports wireless packet-data communications according to a CDMA family of protocols.

Processing unit 1110 comprises one or more general-purpose processors (e.g., INTEL microprocessors) and/or one or more special-purpose processors (e.g., dedicated digital signal processor, application specific integrated circuit, etc.). In turn, the data storage 1104 comprises one or more volatile and/or non-volatile storage components, such as magnetic or optical memory or disk storage. Data storage 1104 can be integrated in whole or in part with processing unit 1110, as cache memory or registers for instance. In example AT 1102, as shown, data storage 1104 is configured to hold both program logic 1106 and program data 1108.

Program logic 1106 may comprise machine language instructions that define routines executable by processing unit 1110 to carry out various functions described herein. In particular the program logic, communication interface, and transceiver may operate cooperatively to carry out logical operation such as that discussed above and illustrated in FIGS. 9 and 10. Further, program data 1108 may be arranged to store one or more tallies of power-control commands maintained in conjunction with the logical operations described above.

It will be appreciated that there can be numerous specific implementations of intelligent power control in an access terminal, such AT 1102 illustrated in FIG. 11. Further, one of skill in the art would understand how to devise and build such an implementation. As such, AT 1102 is representative of means for carrying out the methods of intelligent power control in accordance with the functions and steps described herein by way of example.

d. Example Base Station

Figure 12:
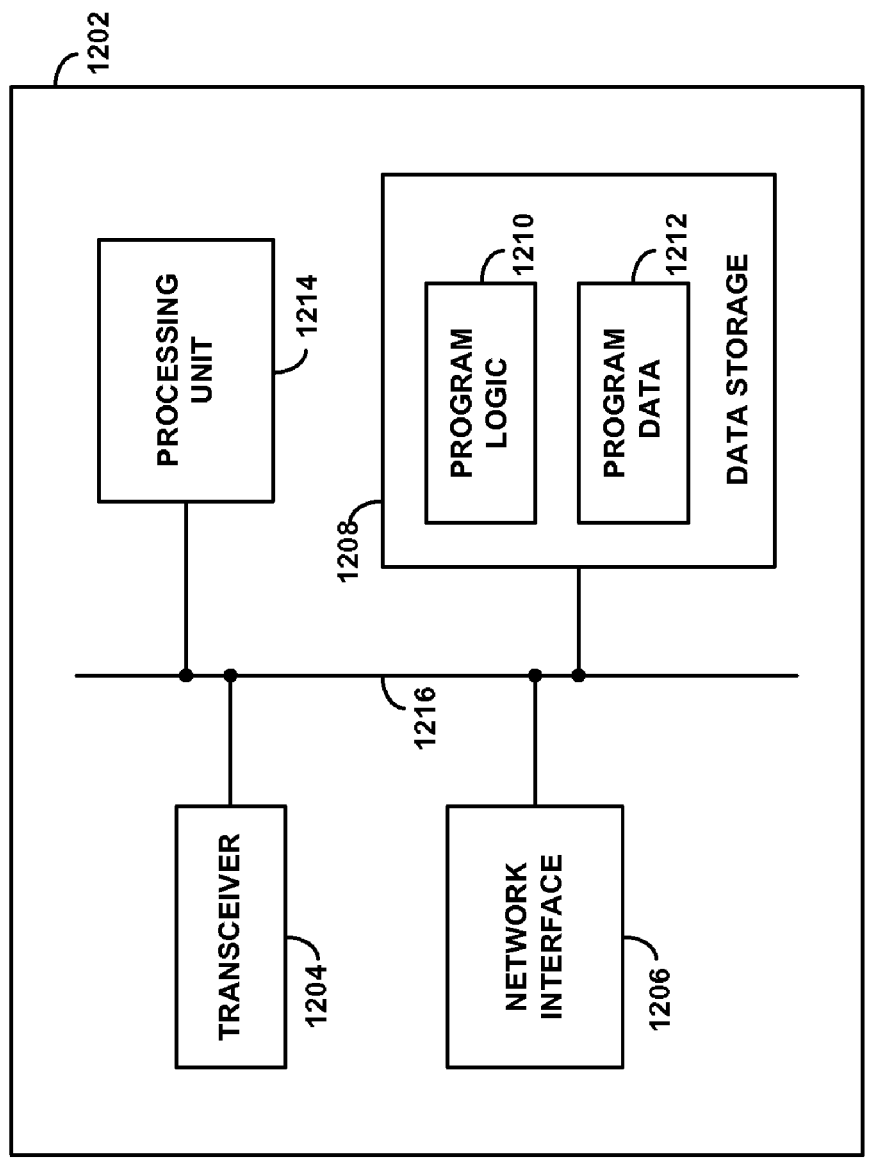
FIG. 12 is a block diagram of an example base station in which intelligent power control and an enhancement of intelligent power control could be implemented.

FIG. 12 is a simplified block diagram depicting functional components of an example base station (or BTS) 1202 in which intelligent power control may be implemented according to either or both of the example embodiment of intelligent power control and the example embodiment of an enhancement of intelligent power control. As shown in FIG. 12, the example base station 1202, representative of BTS 304 or BSC 306 integrated with BTS 304 FIG. 3, for instance, includes a transceiver 1204, network interface 1206, a processing unit 1214, and data storage 1208, all of which may be coupled together by a system bus 1216 or other mechanism. In addition, the base station may also include external storage, such as magnetic or optical disk storage, although this is not shown in FIG. 12.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 1202 relevant to intelligent power control are discussed briefly below.

Network interface 1206 enables communication on a network, such network 300. As such, network interface 1206 may take the form of trunk or optical link that can be coupled with a TDM switch such as MSC 308, or an Ethernet network interface card or other physical connection that can be coupled with PCF 314, for instance. Further, network interface 1206 in combination with transceiver 1204, which may include one or more BTS antennas, enables air interface communication one or more access terminals, supporting reception of power-control commands on the ATs' reverse links and transmission of power control commands on the ATs' forward links.

Processing unit 1214 comprises one or more general-purpose processors (e.g., INTEL microprocessors) and/or one or more special-purpose processors (e.g., dedicated digital signal processor, application specific integrated circuit, etc.). In turn, the data storage 1208 comprises one or more volatile and/or non-volatile storage components, such as magnetic or optical memory or disk storage. Data storage 1208 can be integrated in whole or in part with processing unit 1214, as cache memory or registers for instance. As further shown, data storage 1208 is equipped to hold program logic 1210 and program data 1212.

Program logic 1210 may comprise machine language instructions that define routines executable by processing unit 1214 to carry out various functions described herein. In particular the program logic, communication interface, and transceiver may operate cooperatively to carry out logical operation such as that discussed above and illustrated in FIGS. 9 and 10. Further, program data 1212 may be arranged to store one or more tallies of power-control commands maintained in conjunction with the logical operations described above.

It will be appreciated that there can be numerous specific implementations of intelligent power control in base station, such AT 1202 illustrated in FIG. 12. Further, one of skill in the art would understand how to devise and build such an implementation. As such, AT 1202 is representative of means for carrying out the methods of intelligent power control in accordance with the functions and steps described herein by way of example.

6. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a first device communicatively coupled with a second device via an air interface, a method comprising:

the first device operating in a dynamic-power state in which the first device at least: (i) periodically compares a signal power level of a signal received from the second device with a threshold power level, (ii) transmits a power-increment command to the second device responsive to each comparison that indicates the signal power level is below the threshold power level, and (iii) transmits a power-decrement command to the second device responsive to each comparison that indicates the signal power level is above the threshold power level;

while operating in the dynamic-power state, making a first determination that the first device has transmitted a sequence of a threshold number of alternating power-increment and power-decrement commands to the second device;

responsive to the first determination, transitioning to operating in a steady-power state in which the first device at least: (i) continues to transmit a further sequence of alternating power-increment and power-decrement commands to the second device even if the received signal power level remains above the threshold power level during transmission of the further sequence, and (ii) continues to transmit the further sequence of alternating power-increment and power-decrement commands to the second device even if the received signal power level remains below the threshold power level during transmission of the further sequence;

while operating in the steady-power state, making a second determination that a difference between a currently-received signal power level and the threshold power level is greater than a differential threshold power; and based at least on the second determination, transitioning from operating in the steady-power state to operating in the dynamic-power state.

2. The method of claim 1, wherein the each power-increment command is an instruction to the second device to increase its transmission power by an incremental amount, the incremental amount being selected from the group consisting of a first absolute amount of transmission power, and a first fractional amount of a current transmission power level, and wherein the each power-decrement command is an instruction to the second device to decrease its transmission power by a decremental amount, the decremental amount being selected from the group consisting of a second absolute amount of transmission power, and a second fractional amount of the current transmission power level.

3. The method of claim 1, wherein the first device is a base station that is part of a wireless communication system, the second device is an access terminal operating in the wireless communication system, and the air interface supports a forward link for communications from the base station to the access terminal and a reverse link for communications from the access terminal to the base station.

4. The method of claim 3, wherein the wireless communication system operates according to a CDMA family of protocols, each power-increment command transmitted by the base station is a power-up command transmitted to the access terminal on the forward link according to an inner-loop power-control protocol, and each power-decrement command transmitted by the base station is a power-down command transmitted to the access terminal on the forward link according to the inner-loop power-control protocol.

5. The method of claim 1, wherein the first device is an access terminal operating in a wireless communication system, the second device is a base station that is part of the wireless communication system, and the air interface supports a forward link for communications from the base station to the access terminal and a reverse link for communications from the access terminal to the base station.

6. The method of claim 5, wherein the wireless communication system operates according to a CDMA family of protocols, each power-increment command transmitted by the access terminal is a power-up command transmitted to the base station on the reverse link according to an inner-loop power-control protocol, and each power-decrement command transmitted by the access terminal is a power-down command transmitted to the base station on the reverse link according to the inner-loop power-control protocol.

7. The method of claim 1, wherein making the first determination that the first device has transmitted the sequence of the threshold number of alternating power-increment and power-decrement commands to the second device comprises determining that the signal power level of the signal received from the second device has alternated above and below the threshold power level during a course of a corresponding sequence of comparisons of signal power level of the received signal with the threshold power level.

8. The method of claim 1, wherein operating in the steady-power state comprises:

continuing to transmit alternating power-increment and power-decrement commands to the second device subject to a condition that the signal power level of the signal received from the second device remains in a range, the range being one of: from the threshold power level to the differential threshold power above the threshold power level, and from the threshold power level to the differential threshold power below the threshold power level.

9. The method of claim 1, wherein making the second determination comprises determining that the currently-received signal power level is one of: higher than the differential threshold power above the threshold power level, and lower than the differential threshold power below the threshold power level.

10. The method of claim 1, wherein making the second determination comprises:

determining that the threshold power level has changed to a new threshold power level; and determining that a difference between the currently-received signal power level and the new threshold power level is greater than the differential threshold power.

11. A first device configured to communicate with a second device via an air interface, the first device comprising:

means for operating in a dynamic-power state in which the first device at least: (i) periodically compares a signal power level of a signal received from the second device with a threshold power level, (ii) transmits a power-increment command to the second device responsive to each comparison that indicates the signal power level is below the threshold power level, and (iii) transmits a power-decrement command to the second device responsive to each comparison that indicates the signal power level is above the threshold power level;

means for making a first determination that the first device has transmitted a sequence of a threshold number of alternating power-increment and power-decrement commands to the second device while operating in the dynamic-power state;

means for responding to the first determination by transitioning to operating in a steady-power state in which the first device at least: (i) continues to transmit a further sequence of alternating power-increment and power-decrement commands to the second device even if the received signal power level remains above the threshold power level during transmission of the further sequence, and (ii) continues to transmit the further sequence of alternating power-increment and power-decrement commands to the second device even if the received signal power level remains below the threshold power level during transmission of the further sequence;

means for, while operating in the steady-power state, making a second determination that a difference measured between a currently-received signal power level and the threshold power level is greater than the differential threshold power; and means for transitioning from operating in the steady-power state to operating in the dynamic-power state, based at least on the second determination.

12. The first device of claim 11, wherein the each power-increment command is an instruction to the second device to increase its transmission power by an incremental amount, the incremental amount being selected from the group consisting of a first absolute amount of transmission power, and a first fractional amount of a current transmission power level, and wherein the each power-decrement command is an instruction to the second device to decrease its transmission power by a decremental amount, the decremental amount being selected from the group consisting of a second absolute amount of transmission power, and a second fractional amount of the current transmission power level.

13. The first device of claim 11, wherein the first device is a base station that is part of a wireless communication system, the second device is an access terminal operating in the wireless communication system, and the air interface supports a forward link for communications from the base station to the access terminal and a reverse link for communications from the access terminal to the base station.

14. The first device of claim 13, wherein the wireless communication system is configured to operate according to a CDMA family of protocols, each power-increment command transmitted by the base station is a power-up command transmitted to the access terminal on the forward link according to an inner-loop power-control protocol, and each power-decrement command transmitted by the base station is a power-down command transmitted to the access terminal on the forward link according to the inner-loop power-control protocol.

15. The first device of claim 11, wherein the first device is an access terminal operating in a wireless communication system, the second device is a base station that is part of the wireless communication system, and the air interface supports a forward link for communications from the base station to the access terminal and a reverse link for communications from the access terminal to the base station.

16. The first device of claim 15, wherein the wireless communication system is configured to operate according to a CDMA family of protocols, each power-increment command transmitted by the access terminal is a power-up command transmitted to the base station on the reverse link according to an inner-loop power-control protocol, and each power-decrement command transmitted by the access terminal is a power-down command transmitted to the base station on the reverse link according to the inner-loop power-control protocol.

17. The first device of claim 11, wherein making the first determination that the first device has transmitted the sequence of the threshold number of alternating power-increment and power-decrement commands to the second device comprises determining that the signal power level of the signal received from the second device has alternated above and below the threshold power level for a corresponding sequence of comparisons of signal power level of the received signal with the threshold power level.

18. The first device of claim 11, wherein operating in the steady-power state in which the first device continues to transmit alternating power-increment and power-decrement commands to the second device irrespective of any difference measured between received signal power level and the threshold power level for which the difference is not greater than the differential threshold power comprises:
continuing to transmit alternating power-increment and power-decrement commands to the second device subject to a condition that the signal power level of the signal received from the second device remains in a range, the range being one of: from the threshold power level to the differential threshold power above the threshold power level, from the threshold power level to the differential threshold power below the threshold power level, and from the differential threshold power below the threshold power level to the differential threshold power above the threshold power level.

19. The first device of claim 11, wherein making the second determination comprises determining that the currently-received signal power level is one of: higher than the differential threshold power above the threshold power level, and lower than the differential threshold power below the threshold power level.

20. The first device of claim 11, wherein making the second determination comprises:
determining that the threshold power level has changed to a new threshold power level; and
determining that a difference between the currently-received signal power level and the new threshold power level is greater than the differential threshold power.

21. A non-transitory tangible computer-readable medium having stored thereon computer-executable instructions that, if executed by a first device, cause the first device to perform functions comprising:
operating in a dynamic-power state in which the first device at least: (i) periodically compares a signal power level of a signal received from a second device with a threshold power level, wherein the signal is received on an air interface that is configured to communicatively couple the first device and the second device, (ii) transmits a power-increment command to the second device responsive to each comparison that indicates the signal power level is below the threshold power level, and (iii) transmits a power-decrement command to the second device responsive to each comparison that indicates the signal power level is above the threshold power level;
while operating in the dynamic-power state, making a first determination that the first device has transmitted a sequence of a threshold number of alternating power-increment and power-decrement commands to the second device;
responsive to the first determination, transitioning to operating in a steady-power state in which the first device at least: (i) continues to transmit a further sequence of alternating power-increment and power-decrement commands to the second device even if the received signal power level remains above the threshold power level during transmission of the further sequence, and (ii) continues to transmit the further sequence of alternating power-increment and power-decrement commands to the second device even if the received signal power level remains below the threshold power level during transmission of the further sequence;
while operating in the steady-power state, making a second determination that a difference measured between a currently-received signal power level and the threshold power level is greater than the differential threshold power; and
based at least on the second determination, transitioning from operating in the steady-power state to operating in the dynamic-power state.

22. The non-transitory tangible computer-readable medium of claim 21, wherein the each power-increment command is an instruction to the second device to increase its transmission power by an incremental amount, the incremental amount being selected from the group consisting of a first absolute amount of transmission power, and a first fractional amount of a current transmission power level,
and wherein the each power-decrement command is an instruction the second device to decrease its transmission power by a decremental amount, the decremental amount being selected from the group consisting of a second absolute amount of transmission power, and a second fractional amount of the current transmission power level.

23. The non-transitory tangible computer-readable medium of claim 21, wherein the first device is a base station configured to operate as is part of a wireless communication system, the second device is an access terminal configured to operate in the wireless communication system, and the air interface is configured to support a forward link for communications from the base station to the access terminal and a reverse link for communications from the access terminal to the base station.

24. The non-transitory tangible computer-readable medium of claim 23, wherein the wireless communication system is configured to operate according to a CDMA family of protocols, each power-increment command transmitted by the base station is a power-up command transmitted to the access terminal on the forward link according to an inner-loop power-control protocol, and each power-decrement command transmitted by the base station is a power-down command transmitted to the access terminal on the forward link according to the inner-loop power-control protocol.

25. The non-transitory tangible computer-readable medium of claim 21, wherein the first device is an access terminal configured to operate in a wireless communication system, the second device is a base station configured to operated as part of the wireless communication system, and the air interface is configured to support a forward link for communications from the base station to the access terminal and a reverse link for communications from the access terminal to the base station.

26. The non-transitory tangible computer-readable medium of claim 25, wherein the wireless communication system is configured to operate according to a CDMA family of protocols, each power-increment command transmitted by the access terminal is a power-up command transmitted to the base station on the reverse link according to an inner-loop power-control protocol, and each power-decrement command transmitted by the access terminal is a power-down command transmitted to the base station on the reverse link according to the inner-loop power-control protocol.

27. The non-transitory tangible computer-readable medium of claim 21, wherein making the first determination that the first device has transmitted the sequence of the threshold number of alternating power-increment and power-decrement commands to the second device comprises determining that the signal power level of the signal received from the second device has alternated above and below the threshold power level for a corresponding sequence of comparisons of signal power level of the received signal with the threshold power level.

28. The non-transitory tangible computer-readable medium of claim 21, wherein operating in the steady-power state in which the first device continues to transmit alternating power-increment and power-decrement commands to the second device irrespective of any difference measured between received signal power level and the threshold power level for which the difference is not greater than the differential threshold power comprises:
    continuing to transmit alternating power-increment and power-decrement commands to the second device subject to a condition that the signal power level of the signal received from the second device remains in a range, the range being one of: from the threshold power level to the differential threshold power above the threshold power level, from the threshold power level to the differential threshold power below the threshold power level, and from the differential threshold power below the threshold power level to the differential threshold power above the threshold power level.

29. The non-transitory tangible computer-readable medium of claim 21, wherein making the second determination comprises determining that the currently-received signal power level is one of: higher than the differential threshold power above the threshold power level, and lower than the differential threshold power below the threshold power level.

30. The non-transitory tangible computer-readable medium of claim 21, wherein making the second determination comprises:
    determining that the threshold power level has changed to a new threshold power level; and
    determining that a difference between the currently-received signal power level and the new threshold power level is greater than the differential threshold power.

\* \* \* \* \*